United States Patent
Dagalakis et al.

(10) Patent No.: US 10,737,390 B2
(45) Date of Patent: Aug. 11, 2020

(54) COLLABORATIVE ROBOT MOTION AND FORCE-TORQUE GAUGES

(71) Applicant: Government of the United States of America, as represented by the Secretary of Commerce, Gaithersburg, MD (US)

(72) Inventors: Nicholas G. Dagalakis, Potomac, MD (US); Yong Sik Kim, Boyds, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 315 days.

(21) Appl. No.: 15/899,597

(22) Filed: Feb. 20, 2018

(65) Prior Publication Data

US 2019/0255707 A1 Aug. 22, 2019

(51) Int. Cl.
| | |
|---|---|
| *G05B 19/18* | (2006.01) |
| *B25J 9/16* | (2006.01) |
| *B25J 17/02* | (2006.01) |
| *B25J 18/00* | (2006.01) |

(52) U.S. Cl.
CPC .......... *B25J 9/1692* (2013.01); *B25J 9/1641* (2013.01); *B25J 9/1694* (2013.01); *B25J 17/0275* (2013.01); *B25J 18/00* (2013.01); *Y10S 901/09* (2013.01); *Y10S 901/29* (2013.01); *Y10S 901/46* (2013.01)

(58) Field of Classification Search
CPC ...... B25J 9/1692; B25J 18/00; B25J 17/0275; B25J 9/1694; B25J 9/1641; B25J 9/1682; Y10S 901/29; Y10S 901/09; Y10S 901/46; G05B 2219/39125; G05B 2219/39109
USPC ........................................................ 700/254
See application file for complete search history.

(56) References Cited

U.S. PATENT DOCUMENTS

| | | | |
|---|---|---|---|
| 10,029,369 B1 * | 7/2018 | Carlisle ................... B25J 9/042 |
| 2010/0103431 A1 * | 4/2010 | Demopoulos .......... B25J 9/1692 356/622 |
| 2018/0354136 A1 * | 12/2018 | Carlisle .................. B25J 9/1676 |

* cited by examiner

*Primary Examiner* — Khoi H Tran
*Assistant Examiner* — B M M Hannan
(74) *Attorney, Agent, or Firm* — Office of Chief Counsel for National Institute of Standards and Technology

(57) ABSTRACT

A collaborative robot motion gauge determines a motion of a collaborative robot and includes: a bar; a dextral metrology member disposed on the bar; a dextral motion coupler moveably disposed on the bar; a dextral displacement sensor disposed on the dextral metrology member in communication with the dextral motion coupler; a dextral arm coupler disposed on the dextral motion coupler and that: couples to a dextral arm of the collaborative robot to the dextral motion coupler; communicates motion of the dextral arm to the dextral displacement sensor; and moves the dextral motion coupler in response to motion of the dextral arm; a sinistral metrology member disposed on the bar at a sinistral position; a sinistral motion coupler; a sinistral displacement sensor in communication with the sinistral motion coupler; and a sinistral arm coupler that couples a sinistral arm to the sinistral motion coupler.

19 Claims, 29 Drawing Sheets

COLLABORATIVE ROBOT MOTION AND FORCE-TORQUE GAUGES

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 301-975-2573; email tpo@nist.gov.

BRIEF DESCRIPTION

Disclosed is a collaborative robot motion gauge that determines a motion of a collaborative robot and comprising: a bar; a dextral metrology member disposed on the bar at a dextral position; a dextral motion coupler moveably disposed on the bar proximate to the dextral metrology member; a dextral displacement sensor disposed on the dextral metrology member in communication with the dextral motion coupler; a dextral arm coupler disposed on the dextral motion coupler and that: couples to a dextral arm of the collaborative robot to the dextral motion coupler; communicates motion of the dextral arm to the dextral displacement sensor; and moves the dextral motion coupler in response to motion of the dextral arm; a sinistral metrology member disposed on the bar at a sinistral position and spaced apart from the dextral metrology member on the bar; a sinistral motion coupler moveably disposed on the bar proximate to the sinistral metrology member; a sinistral displacement sensor disposed on the sinistral metrology member in communication with the sinistral motion coupler; a sinistral arm coupler disposed on the sinistral motion coupler and that: couples a sinistral arm of the collaborative robot to the sinistral motion coupler; communicates motion of the sinistral arm to the sinistral displacement sensor; and moves the sinistral motion coupler in response to motion of the sinistral arm.

Also disclosed is a collaborative robot force-torque gauge that determines a force and torque exerted by a collaborative robot and comprising: a dextral bar; a sinistral bar disposed on the dextral bar; a force-torque cell interposed between the dextral bar and the sinistral bar; a dextral arm coupler disposed on the dextral bar via a joint such that the dextral arm coupler: couples a dextral arm of the collaborative robot to the dextral bar; and communicates force and torque exerted by the dextral arm to the force-torque cell through the dextral arm; and a sinistral arm coupler disposed on the dextral bar via a second joint such that the sinistral arm coupler: couples a sinistral arm of the collaborative robot to the sinistral bar; and communicates force and torque exerted by the sinistral arm to the force-torque cell through the sinistral arm.

Further disclosed is a process for determining an error in a motion of a collaborative robot, with the collaborative robot motion gauge of claim 1, the process comprising: attaching the collaborative robot motion gauge to the collaborative robot; moving the dextral motion coupler or the sinistral motion coupler in response to moving the dextral arm or the sinistral arm of the collaborative robot; detecting movement of: the dextral motion coupler by the dextral displacement sensor when the dextral arm moves the sinistral motion coupler by the sinistral displacement sensor when the sinistral arm moves; producing a dextral displacement signal by the dextral displacement sensor in response to detecting movement of dextral motion coupler; producing a sinistral displacement signal by the sinistral displacement sensor in response to detecting movement of sinistral motion coupler; determining an error in the motion of the collaborative robot from the dextral displacement signal and the sinistral displacement signal.

Also disclosed is a process for determining a force and torque exerted by a collaborative robot, with the collaborative robot force-torque gauge of claim 19, the process comprising: attaching the collaborative robot force-torque gauge to the collaborative robot; applying a force and torque by the dextral arm and the sinistral arm of the collaborative robot to the force-torque cell through the dextral bar and the sinistral bar; detecting the force and torque by the force-torque cell; producing a force and torque signal by the force-torque cell in response to detecting the force and torque; and determining the force and torque applied by the collaborative robot from the force and torque signal.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
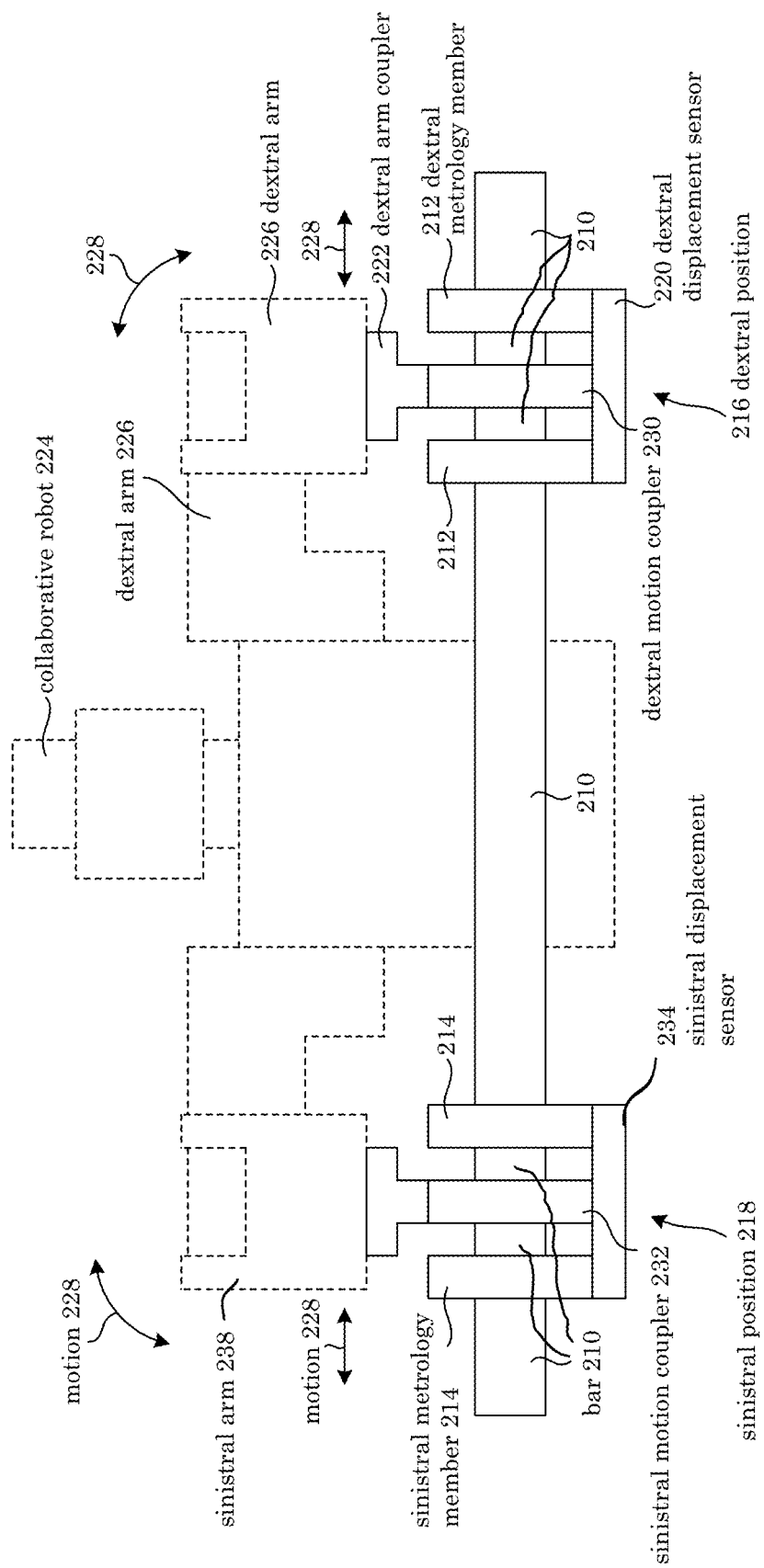
FIG. 1 shows a collaborative robot motion gauge.

A detailed description of one or more embodiments is presented herein by way of exemplification and not limitation.

It has been discovered that a collaborative robot motion gauge, a collaborative robot force-torque gauge, a process for determining an error in a motion of a collaborative robot, and a process for determining a force and a torque exerted by a collaborative robot unexpectedly and advantageously measure performance of robot arms performing programmed collaborative three-dimensional (3D) space motions and gripping parts with programmed forces and torques. Magnetic coupling of the collaborative robot motion gauge and the collaborative robot force-torque gauge mounting to robot arms is easy. Sensor adaptability of the collaborative robot motion gauge and the collaborative robot force-torque gauge provide high accuracy, low cost and weight selection.

In an embodiment, with reference to FIG. 1, FIG. 2, FIG. 3, FIG. 4, and FIG. 5, collaborative robot motion gauge 200 determines motion 228 of collaborative robot 224 and includes bar 210; dextral metrology member 212 disposed on bar 210 at dextral position 216; dextral motion coupler 230 moveably disposed on bar 210 proximate to dextral metrology member 212; dextral displacement sensor 220 disposed on dextral metrology member 212 in communication with dextral motion coupler 230; and dextral arm coupler 222 disposed on dextral motion coupler 230. Dextral motion coupler 230 couples dextral arm 226 of collaborative robot 224 to dextral motion coupler 230; communicates motion of dextral arm 226 to dextral displacement sensor 220; and moves dextral motion coupler 230 in response to motion of dextral arm 226. Collaborative robot motion gauge 200 also includes sinistral metrology member 214 disposed on bar 210 at sinistral position 218 and spaced apart from dextral metrology member 212 on bar 210; sinistral motion coupler 232 moveably disposed on bar 210 proximate to sinistral metrology member 214; sinistral displacement sensor 234 disposed on sinistral metrology member 214 in communication with sinistral motion coupler 232; and sinistral arm coupler 236 disposed on sinistral motion coupler 232. Sinistral arm coupler 236 couples sinistral arm 238 of collaborative robot 224 to sinistral motion coupler 232; communicates motion of sinistral arm 238 to sinistral displacement sensor 234; and moves sinistral motion coupler 232 in response to motion of sinistral arm 238.

Collaborative robot motion gauge 200 also can include dextral ball-and-socket joint 240 that includes a portion of dextral motion coupler 230 and dextral arm coupler 222. In an embodiment, dextral motion coupler 230 include socket 242, and dextral arm coupler 222 comprises ball 244, wherein socket 242 receives ball 244 in dextral ball-and-socket joint 240. According to an embodiment, dextral motion coupler 230 includes ball 244, and dextral arm coupler 222 includes socket 242, wherein socket 242 receives ball 244 in dextral ball-and-socket joint 240.

Collaborative robot motion gauge 200 also can include sinistral ball-and-socket joint 246 that includes a portion of sinistral motion coupler 232 and sinistral arm coupler 236. In an embodiment, sinistral motion coupler 232 includes socket 242, and sinistral arm coupler 236 includes ball 244, wherein socket 242 receives ball 244 in sinistral ball-and-socket joint 246. According to an environment, sinistral motion coupler 232 includes ball 244, and sinistral arm coupler 236 includes socket 242, wherein socket 242 receives ball 244 in sinistral ball-and-socket joint 246.

In collaborative robot motion gauge 200, bar 210 includes primary guide 248 and secondary guide 250 spaced apart from primary guide 248. Guide spacer 252 separates primary guide 248 from secondary guide 250.

Figure 5:
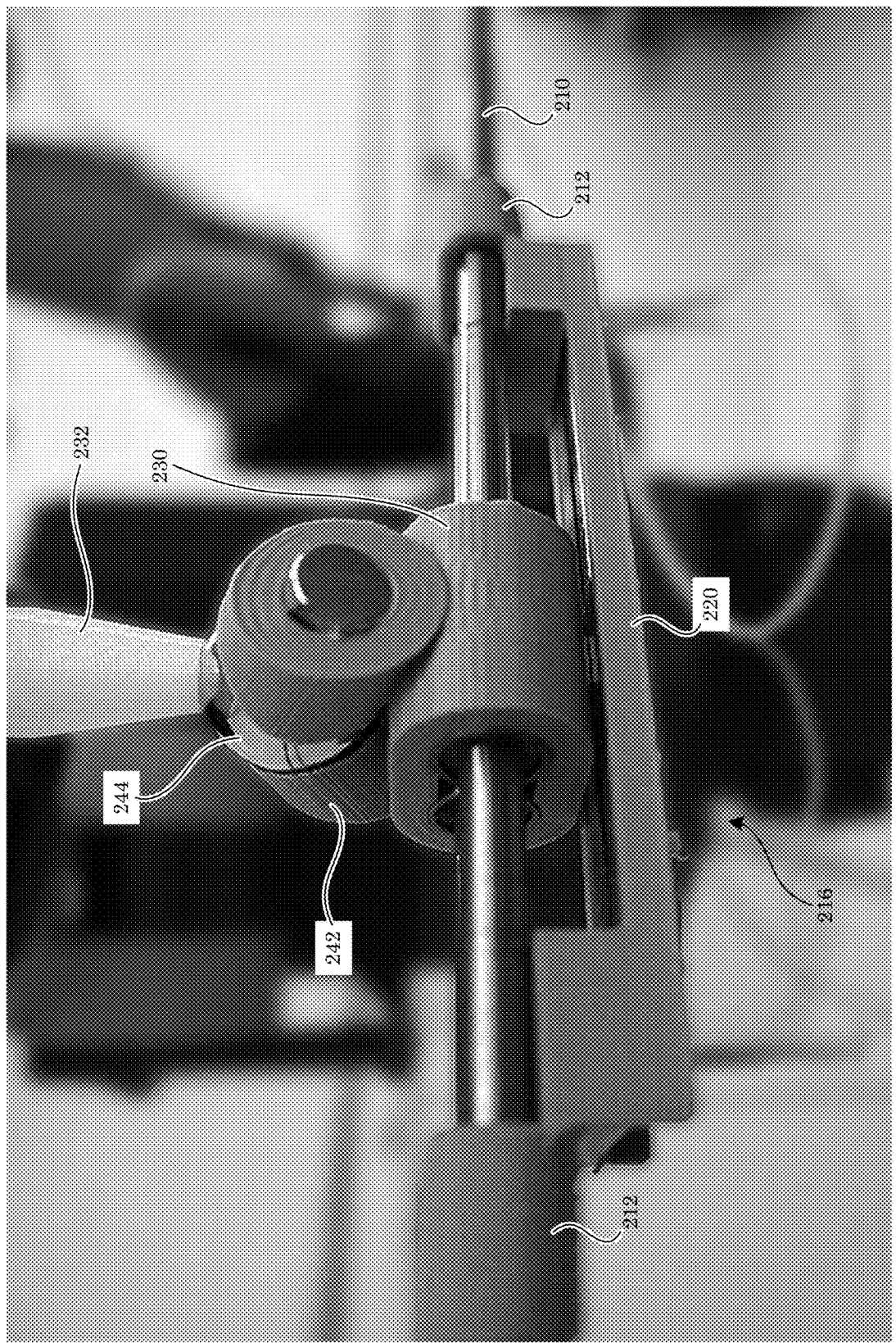
FIG. 5 shows an enlarged view of a dextral portion of the collaborative robot motion gauge shown in FIG. 3.
Figure 6:
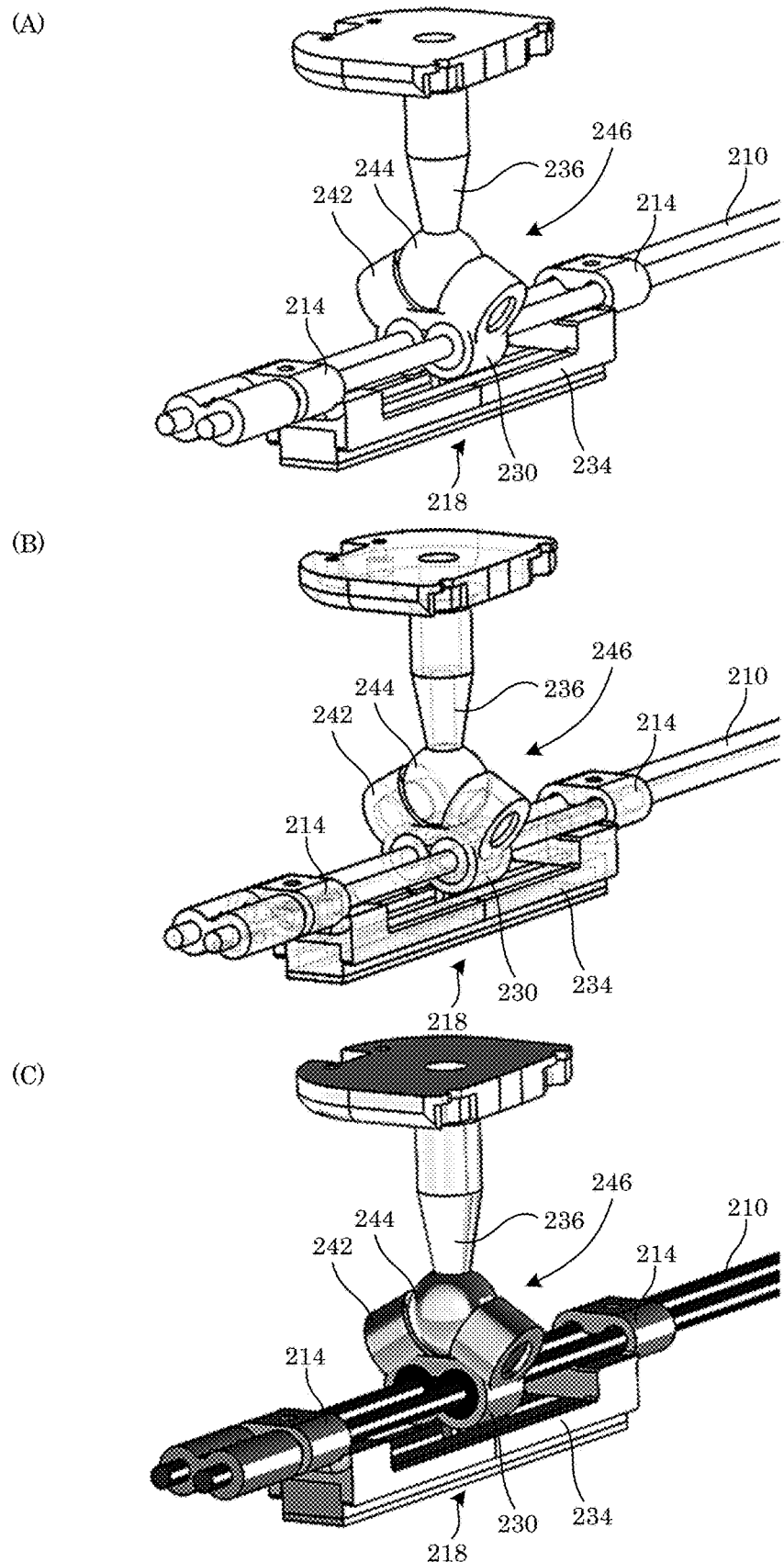
FIG. 6 shows perspective views view of a dextral portion of the collaborative robot motion gauge shown in FIG. 5 in which panel A shows a solid view; panel B is a wireframe view, and panel C is a shaded view.
Figure 7:
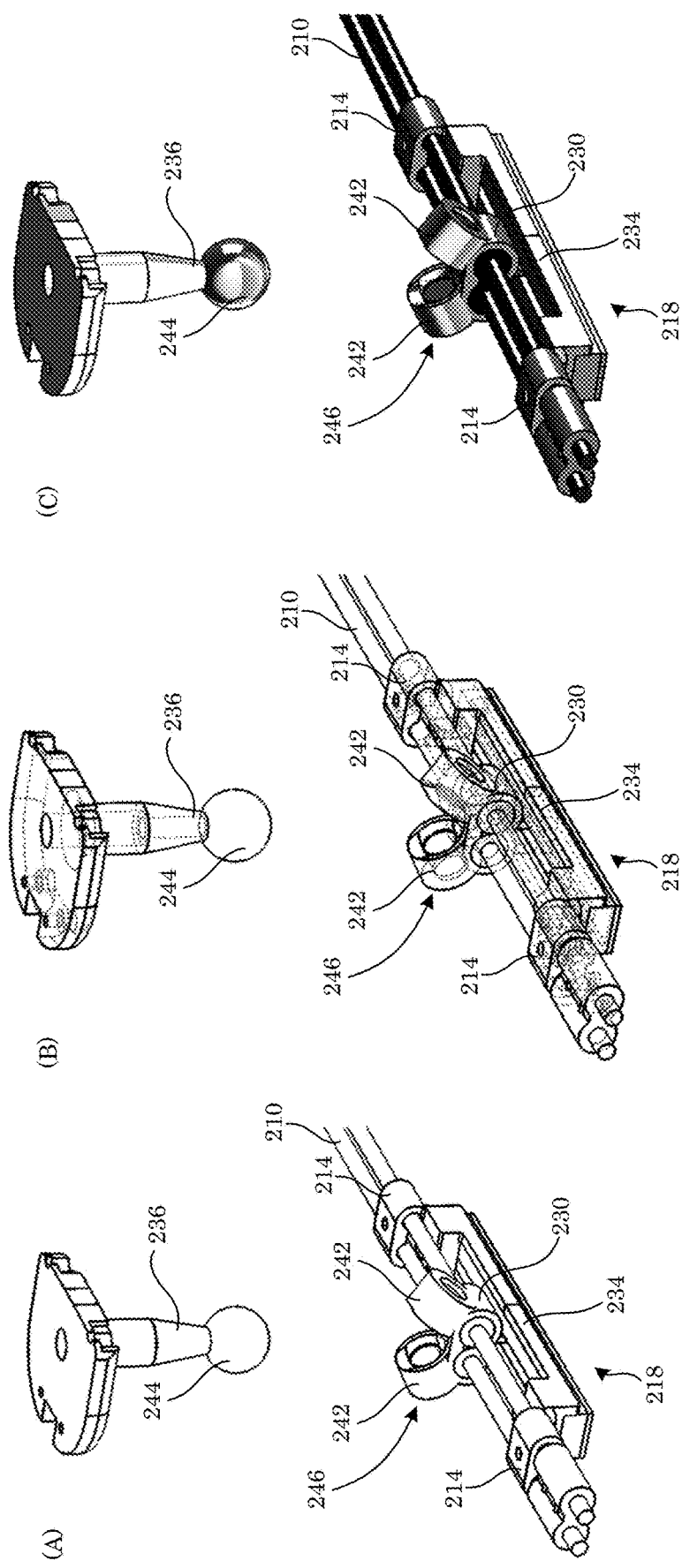
FIG. 7 shows exploded perspective views view of a dextral portion of the collaborative robot motion gauge shown in FIG. 5 in which panel A shows a solid view; panel B is a wireframe view, and panel C is a shaded view.
Figure 8:
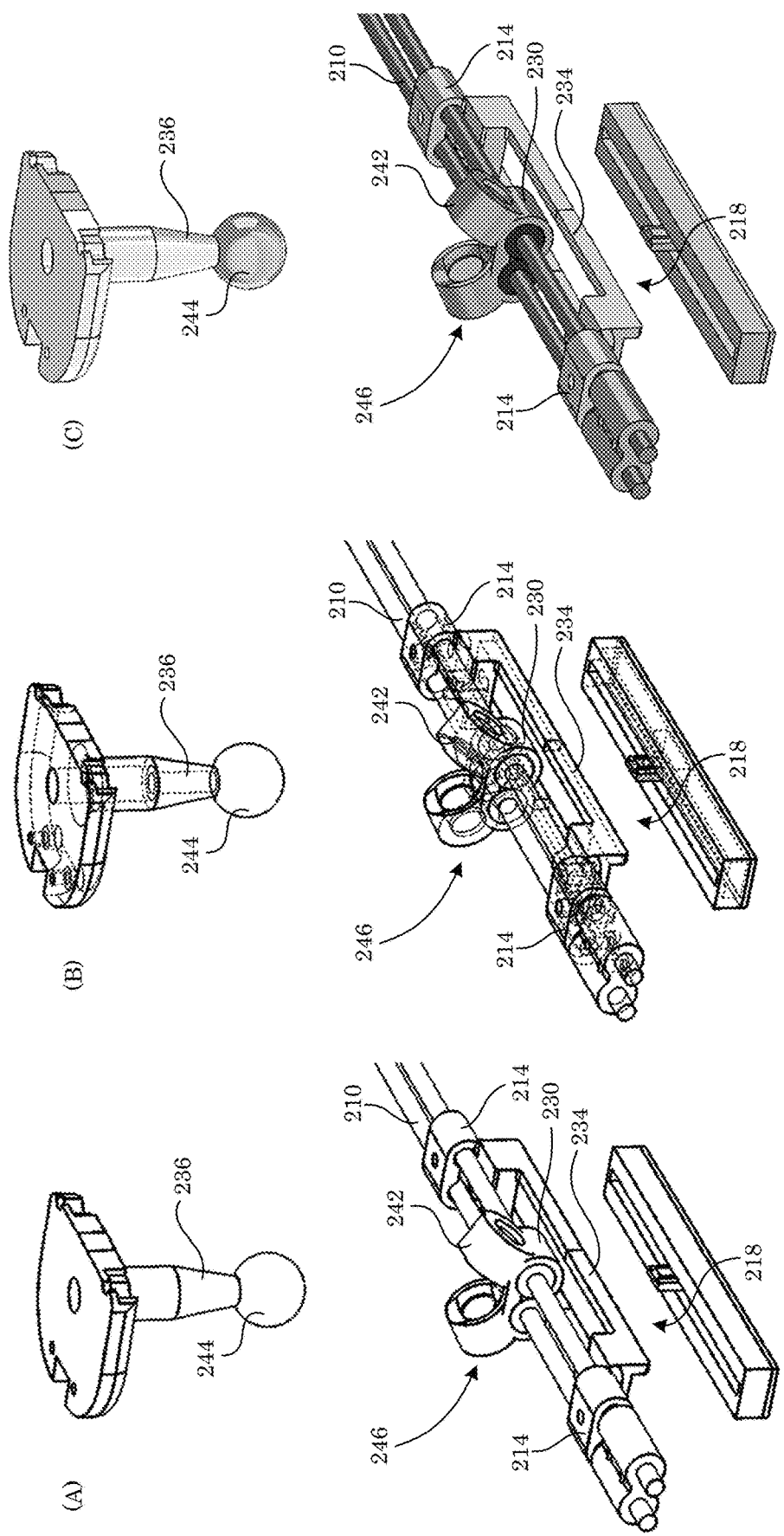
FIG. 8 shows exploded perspective views view of a dextral portion of the collaborative robot motion gauge shown in FIG. 5 in which panel A shows a solid view; panel B is a wireframe view, and panel C is a shaded view.
Figure 9:
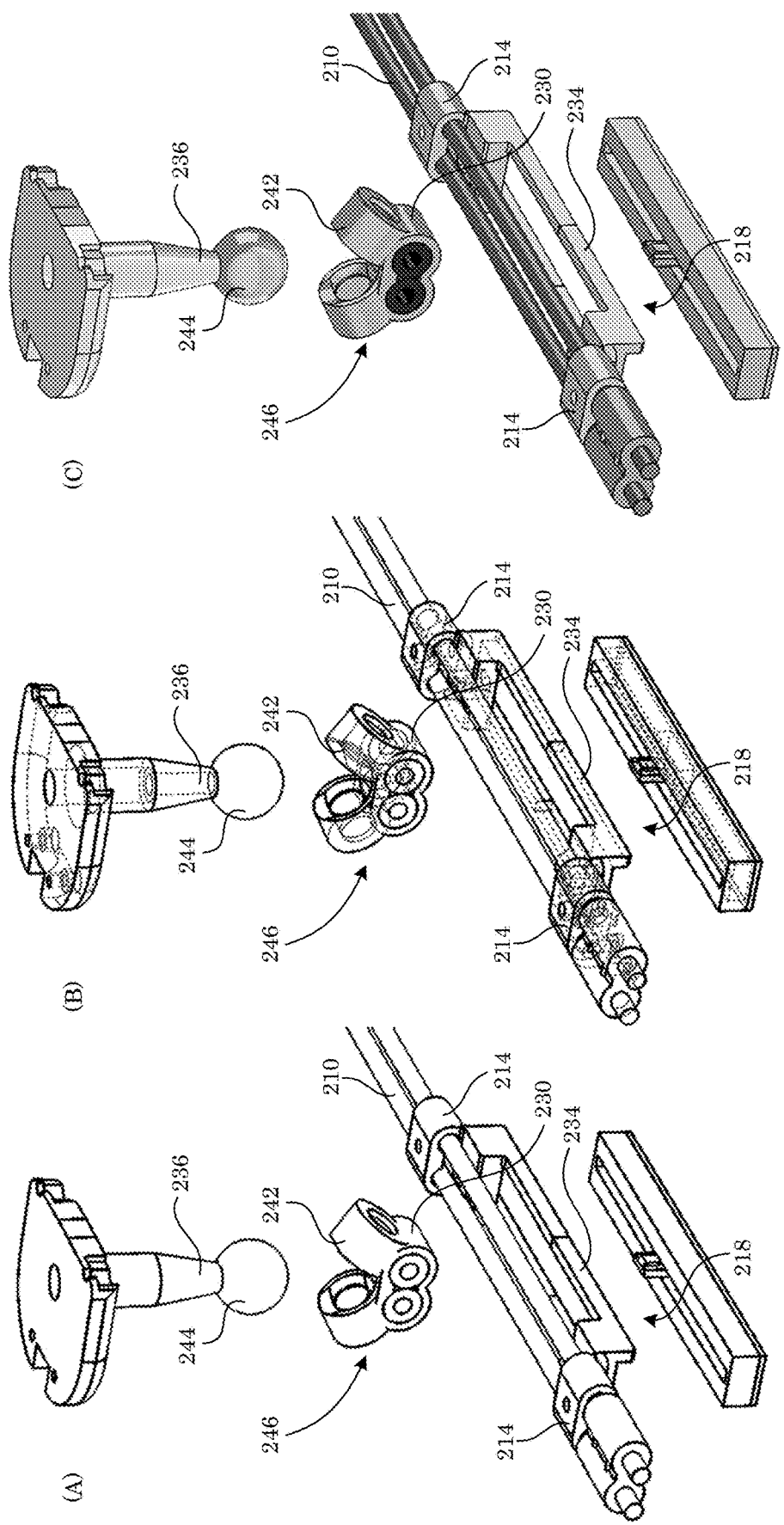
FIG. 9 shows exploded perspective views view of a dextral portion of the collaborative robot motion gauge shown in FIG. 5 in which panel A shows a solid view; panel B is a wireframe view, and panel C is a shaded view.
Figure 10:
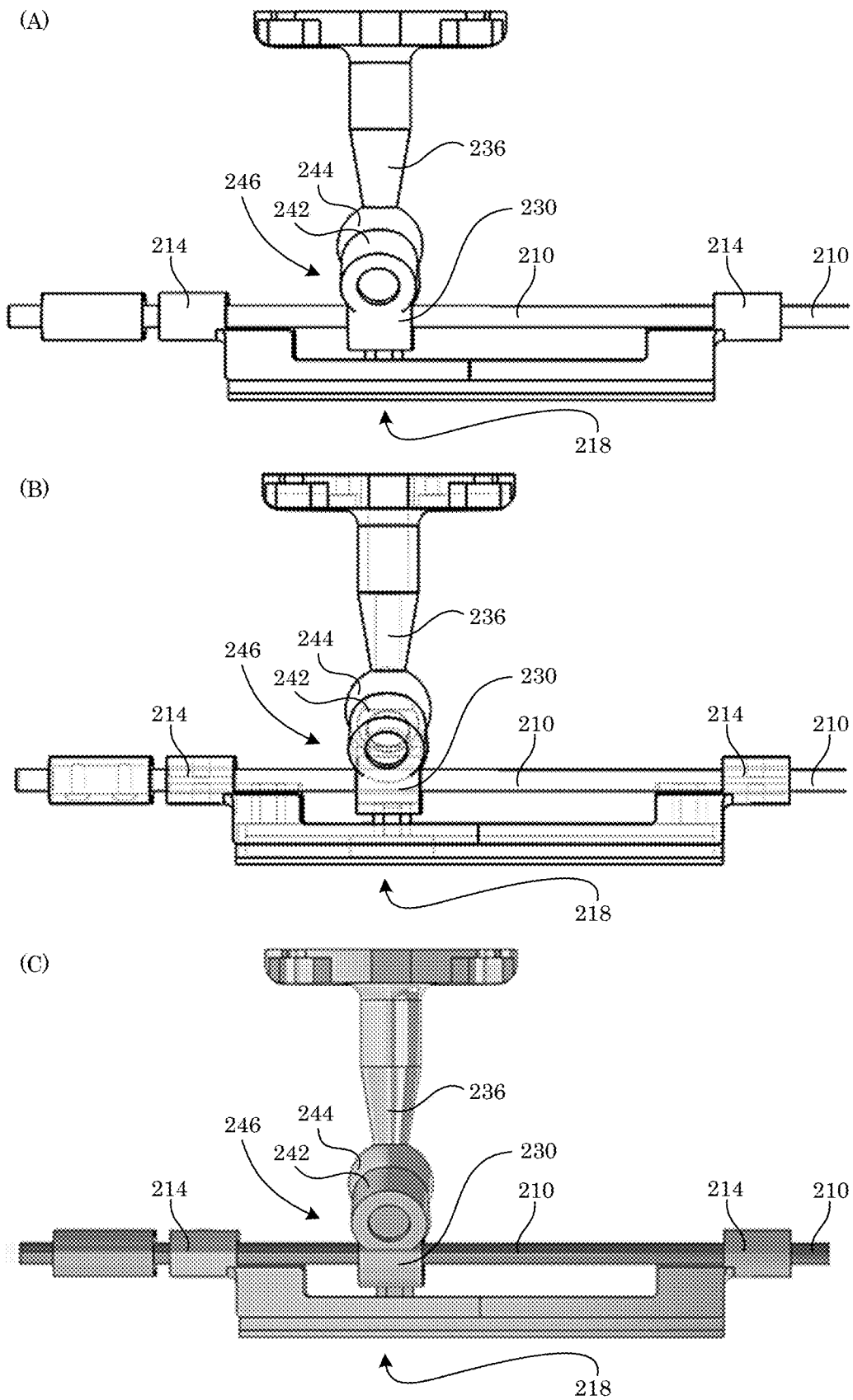
FIG. 10 shows side views of a dextral portion of the collaborative robot motion gauge shown in FIG. 5 in which panel A shows a solid view; panel B is a wireframe view, and panel C is a shaded view.
Figure 11:
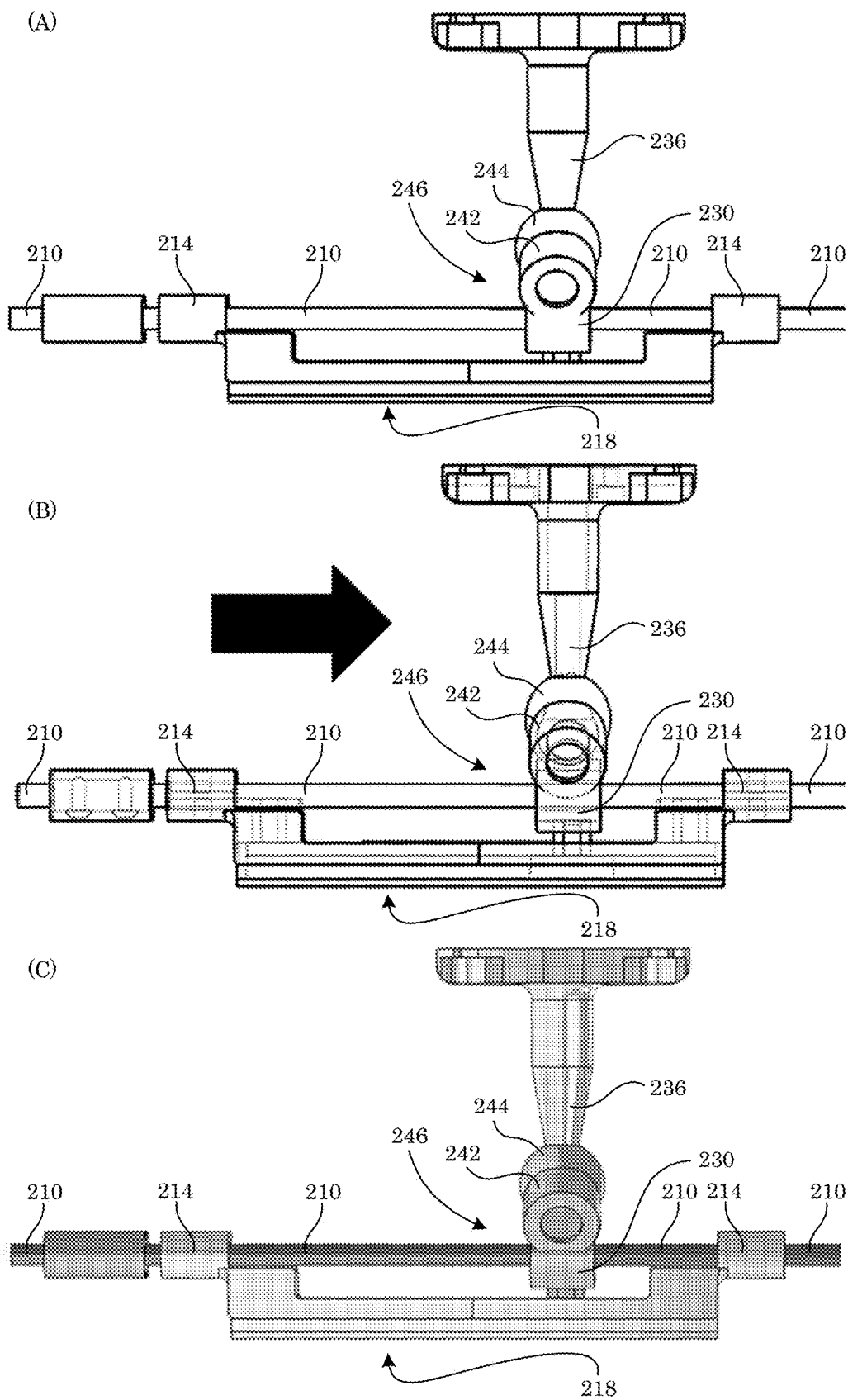
FIG. 11 shows side views of a dextral portion of the collaborative robot motion gauge shown in FIG. 10, wherein motion is depicted in a left-to-right direction and in which panel A shows a solid view; panel B is a wireframe view, and panel C is a shaded view.
Figure 12:
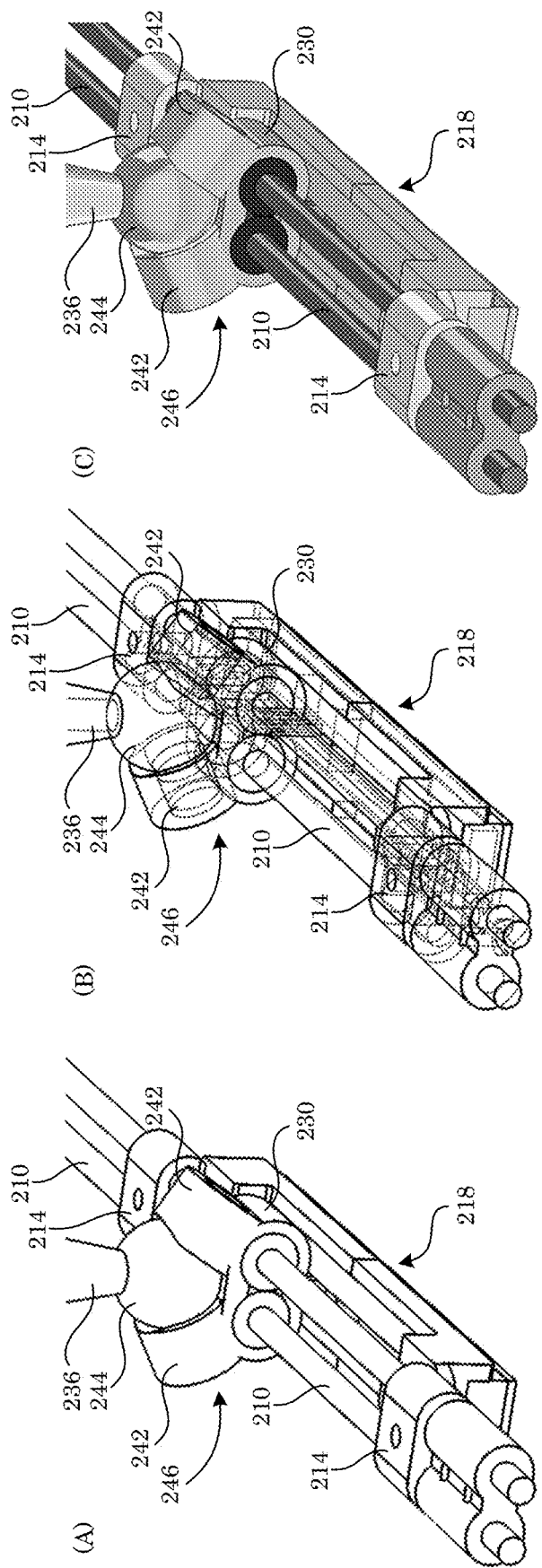
FIG. 12 shows perspective views of a dextral portion of the collaborative robot motion gauge shown in FIG. 5 in which panel A shows a solid view; panel B is a wireframe view, and panel C is a shaded view.
Figure 13:
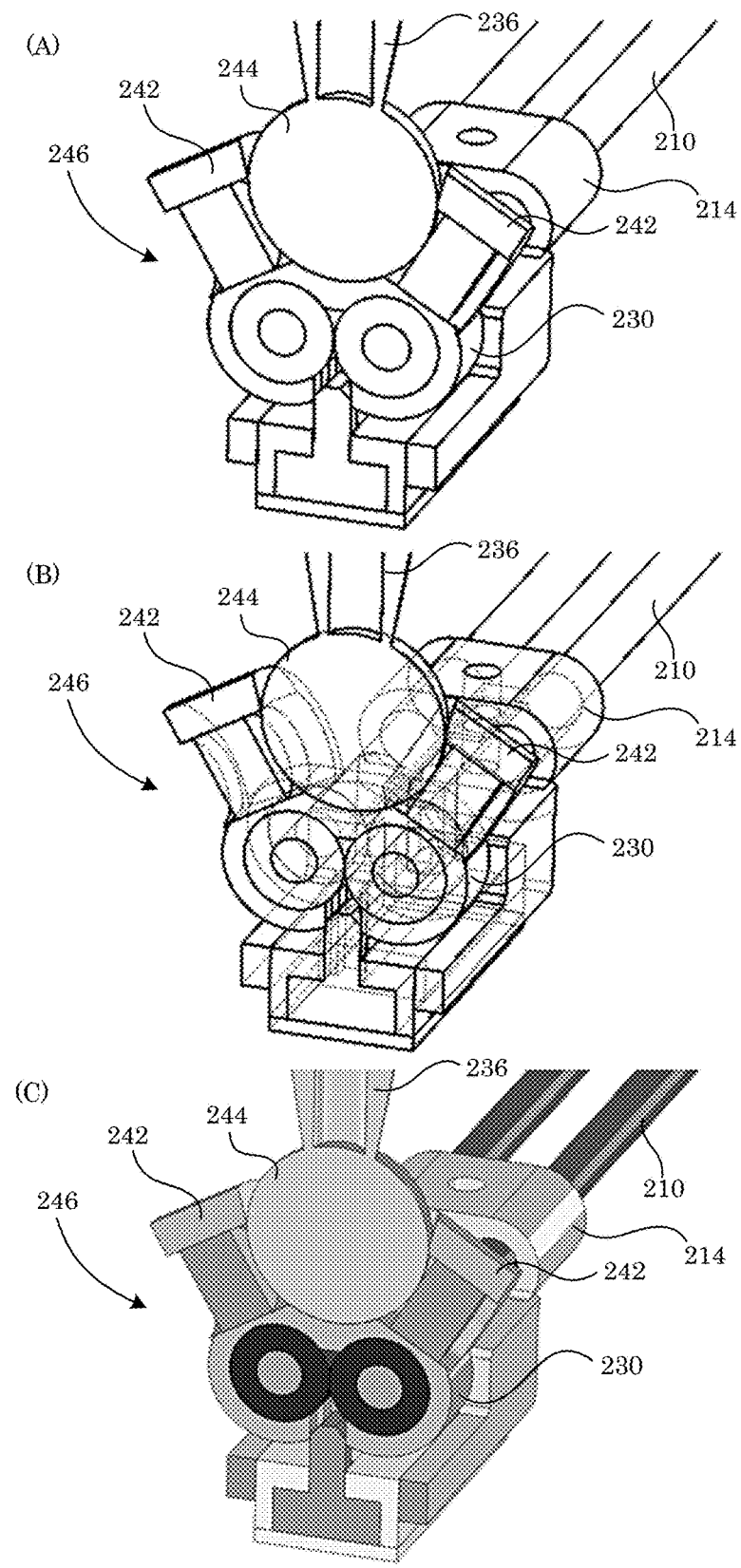
FIG. 13 shows cutaway perspective views of a dextral portion of the collaborative robot motion gauge shown in FIG. 5 in which panel A shows a solid view; panel B is a wireframe view, and panel C is a shaded view.
Figure 14:
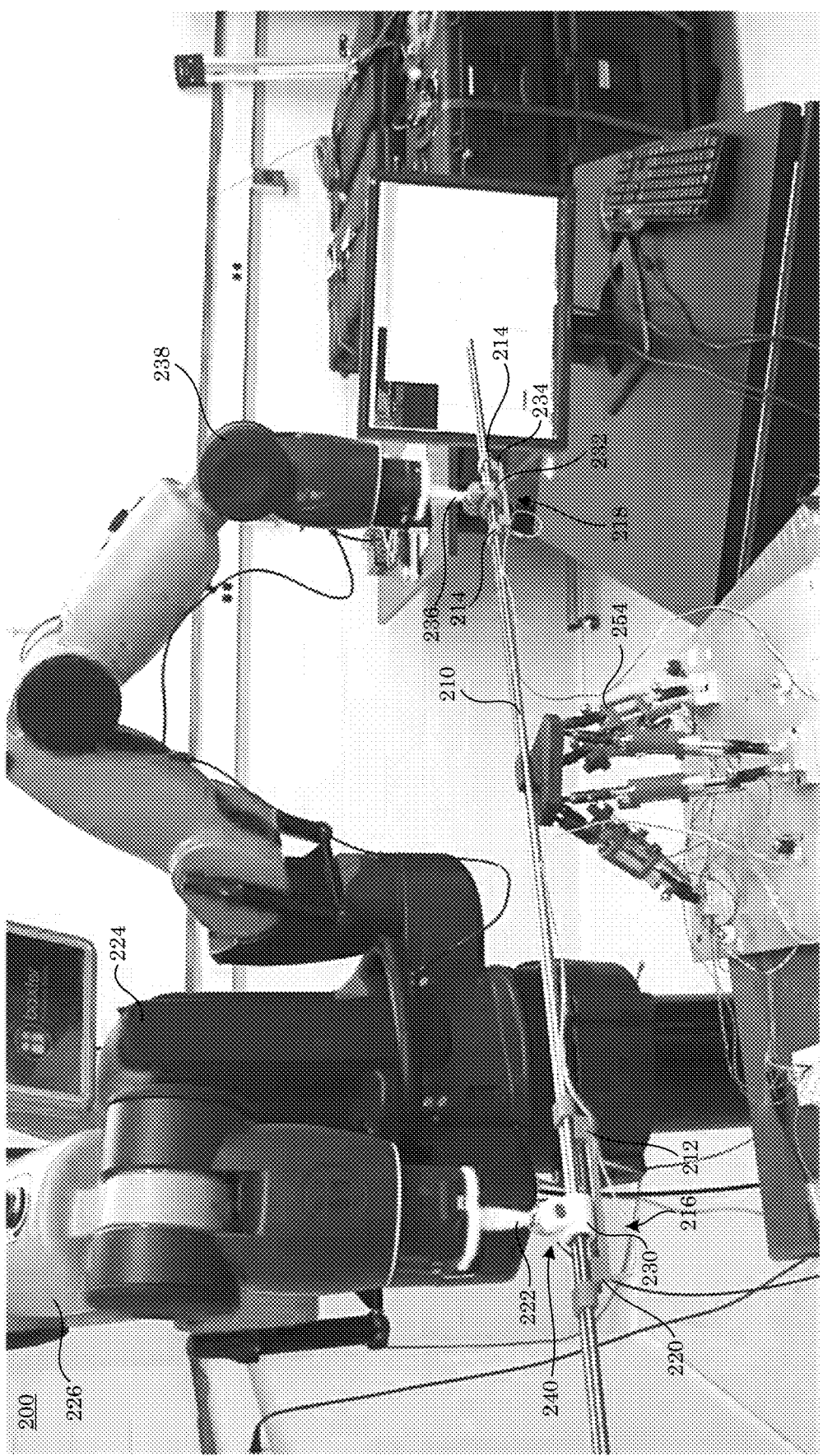
FIG. 14 shows a collaborative robot motion gauge that includes a hexapod.

With reference to FIG. 5 and FIG. 14, collaborative robot motion gauge 200 also can include hexapod 254 in mechanical communication with bar. Hexapod can be used to determining a pose of collaborative robot 224.

Figure 16:
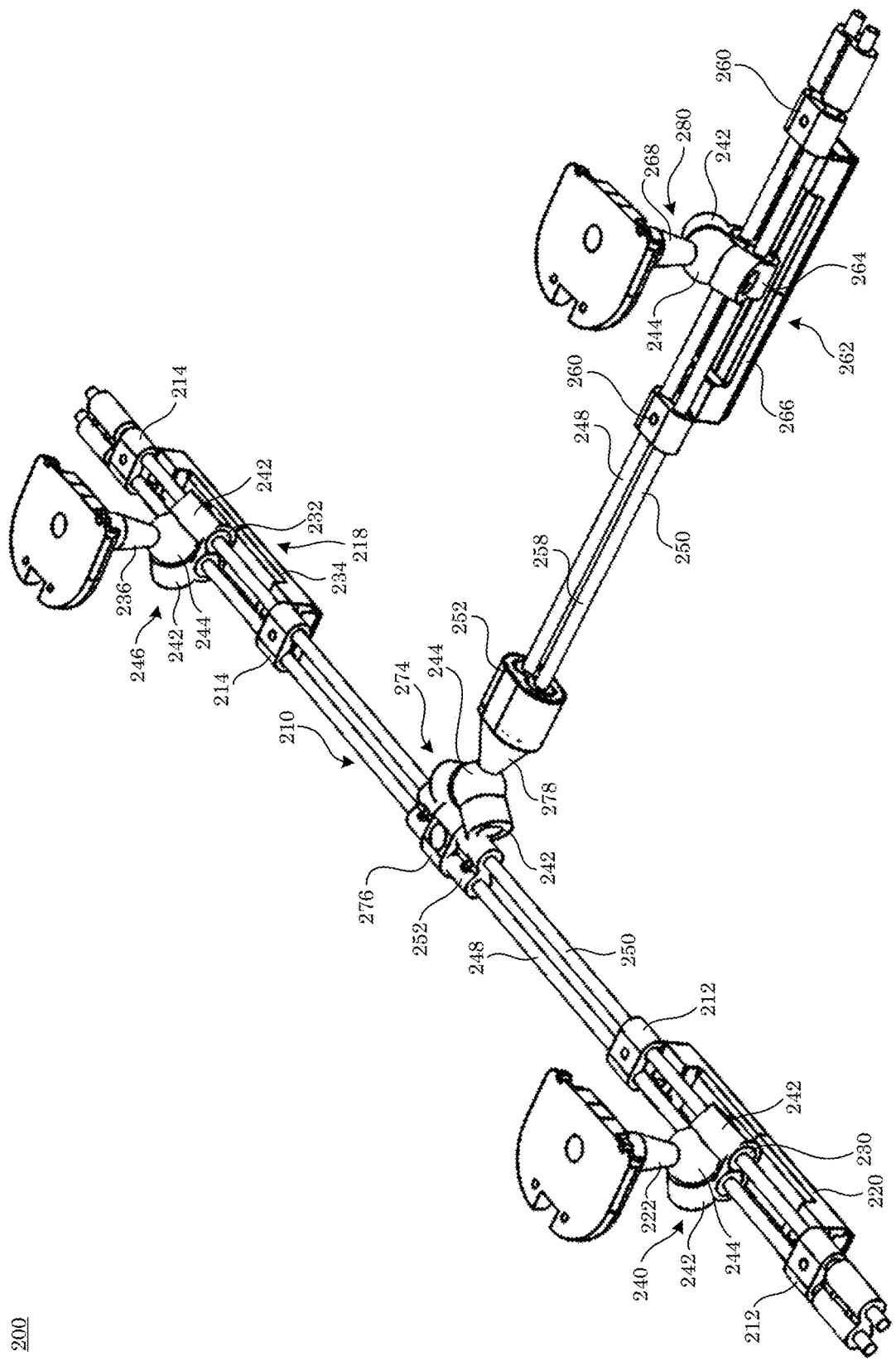
FIG. 16 shows a collaborative robot motion gauge.
Figure 17:
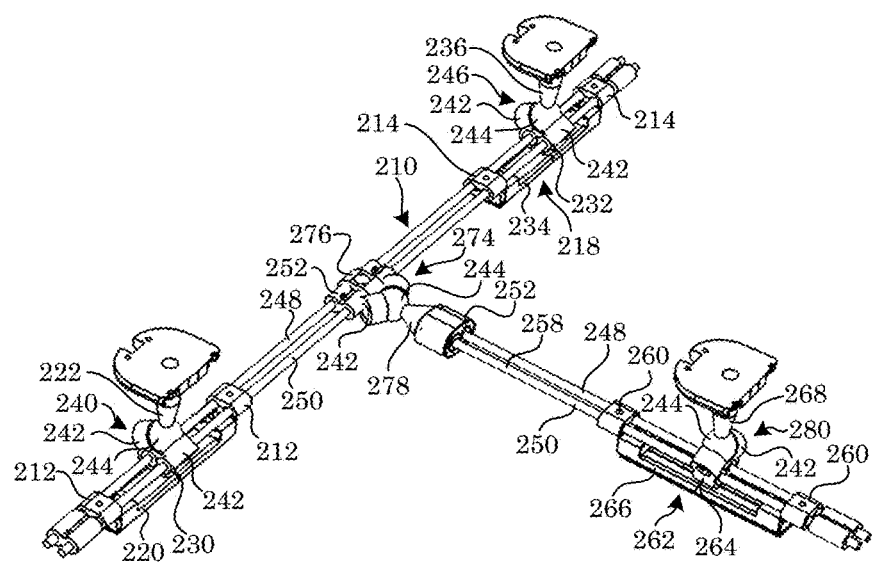
Figure 17:
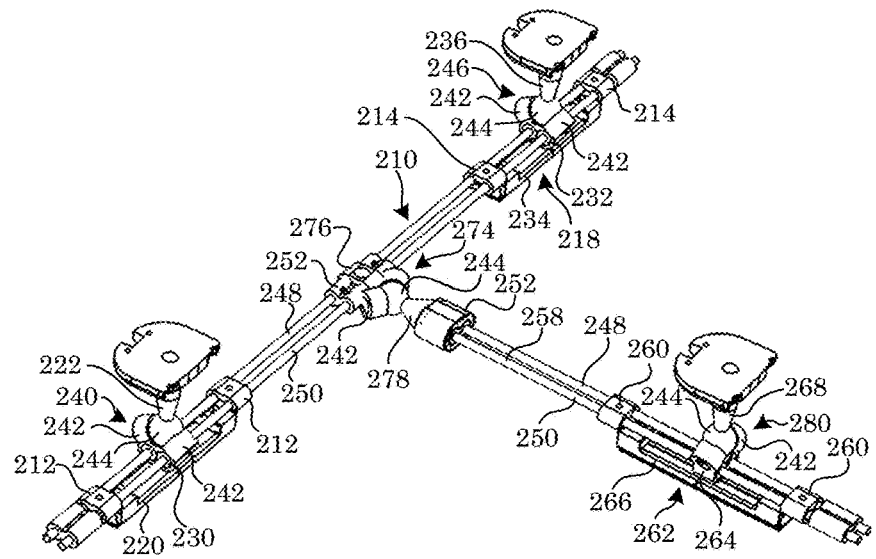
Figure 17:
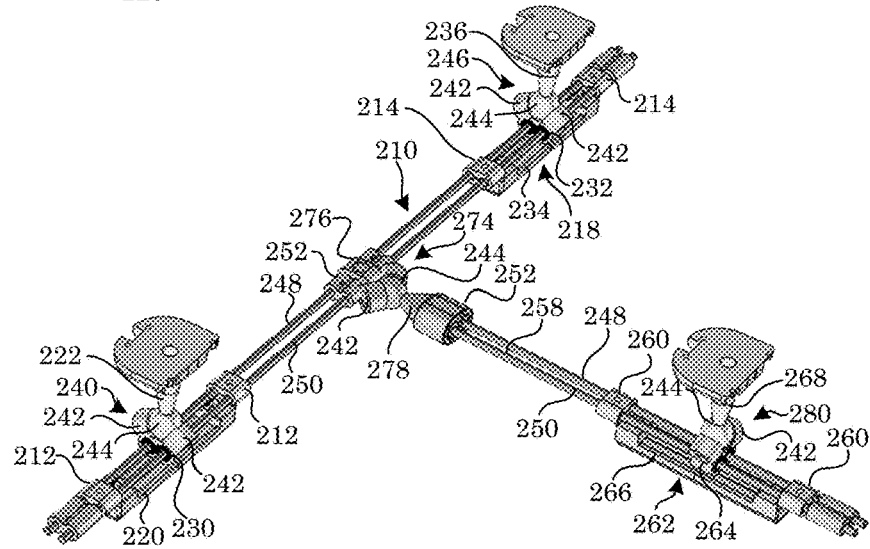
Figure 18:
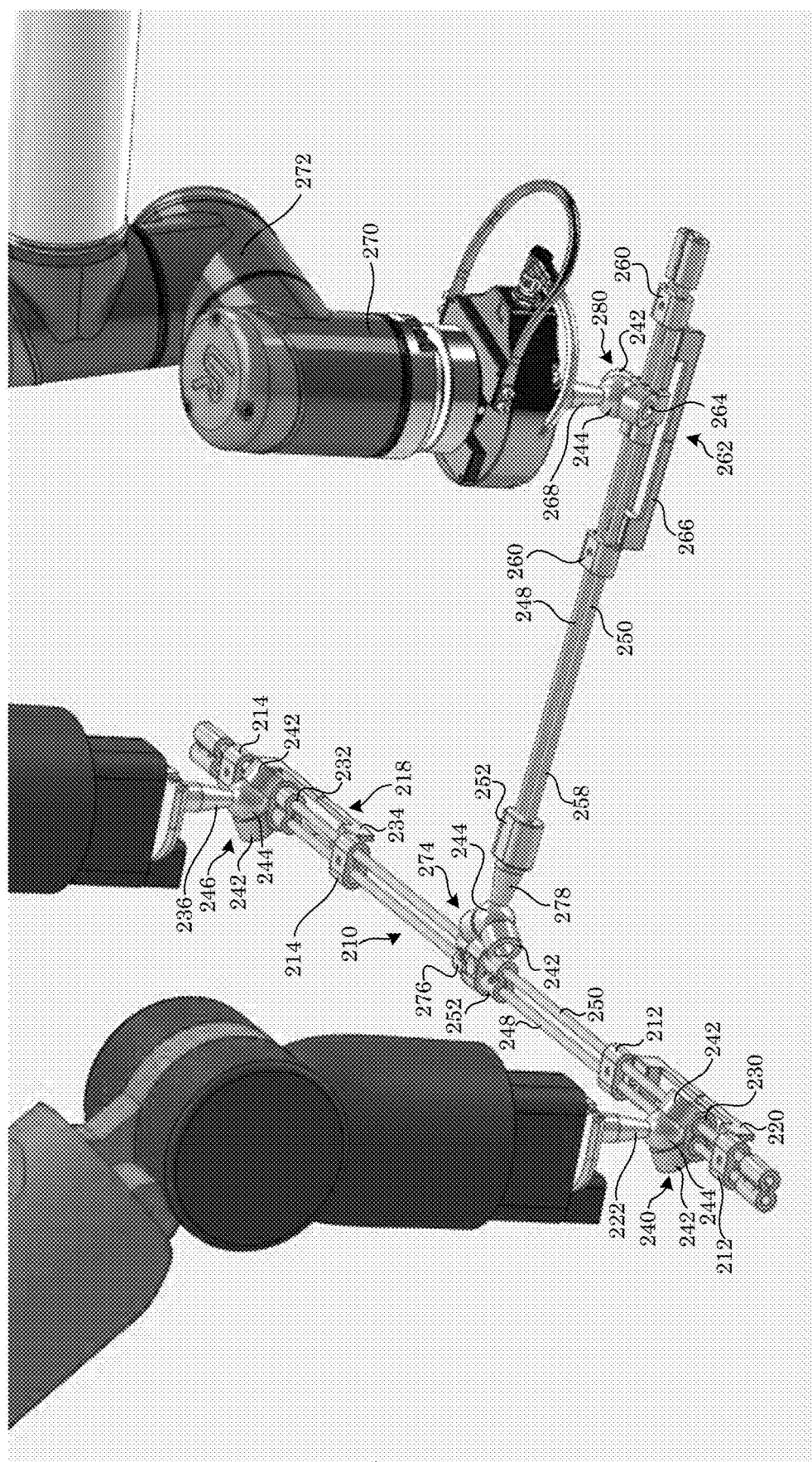
FIG. 18 shows the collaborative robot motion gauge disposed on a collaborative robot and a second robot.

In an embodiment, with reference to FIG. 16 and FIG. 18, collaborative robot motion gauge 200 includes collaboration bar 258 in mechanical communication with bar 210. Collaborative robot motion gauge 200 also can include collaboration metrology member 260 disposed on collaboration bar 258 at distal position 262 relative to bar 210. Collaboration motion coupler 264 is moveably disposed on collaboration bar 258 proximate to collaboration metrology member 260. Collaboration displacement sensor 266 is disposed on collaboration metrology member 260 in communication with collaboration motion coupler 264. Collaboration arm coupler 268 is disposed on collaboration motion coupler 264. Collaboration arm coupler 268 couples collaboration arm 270 of second robot 272 to collaboration motion coupler 264; communicates motion of collaboration arm 270 to collaboration displacement sensor 266; and moves collaboration motion coupler 264 in response to motion of collaboration arm 270.

Collaborative robot motion gauge 200 also can include collaboration ball-and-socket joint 280 that includes a portion of the collaboration motion coupler and the collaboration arm coupler and includes a ball and socket.

Collaboration bar 258 can include primary guide 248 and secondary guide 250 spaced apart from primary guide 248. Guide spacer 252 separates primary guide 248 from secondary guide 250. Extension joint 274 joins bar 210 and collaboration bar 258. Extension coupler 276 is disposed on bar 210. Attachment coupler 278 is disposed on collaboration bar 258, wherein extension coupler 276 receives attachment coupler 278 in extension joint 274.

Figure 19:
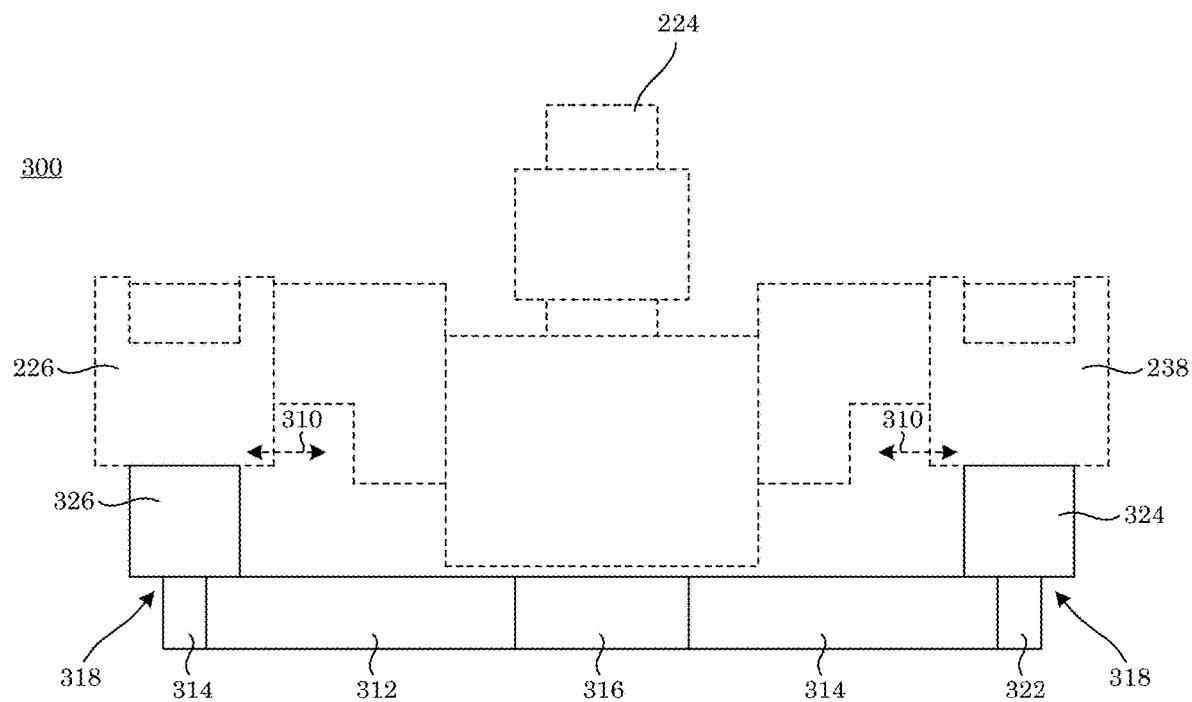
FIG. 19 shows a collaborative robot force/torque gauge.
Figure 20:
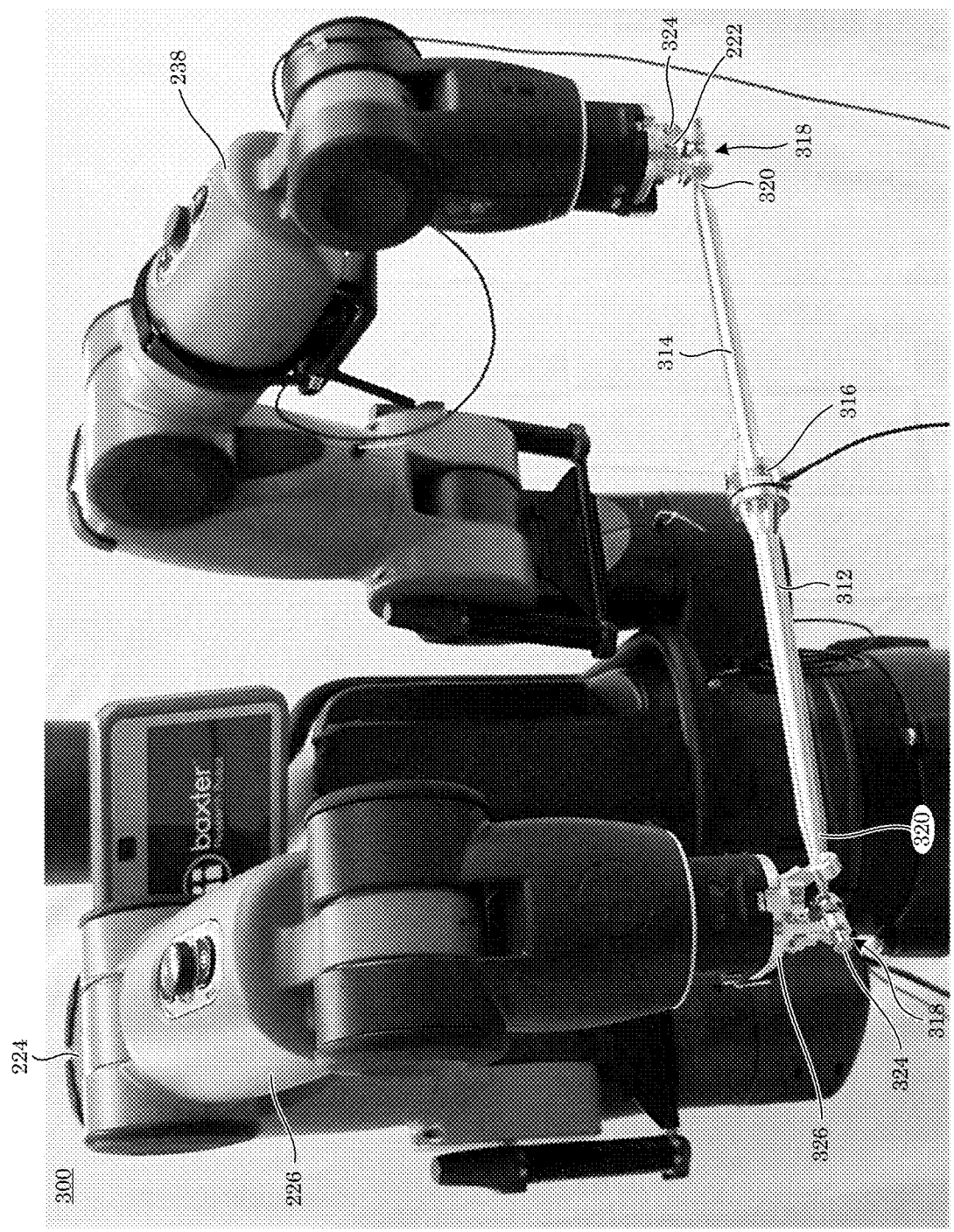
FIG. 20 shows a collaborative robot force gauge disposed on a collaborative robot.
Figure 22:
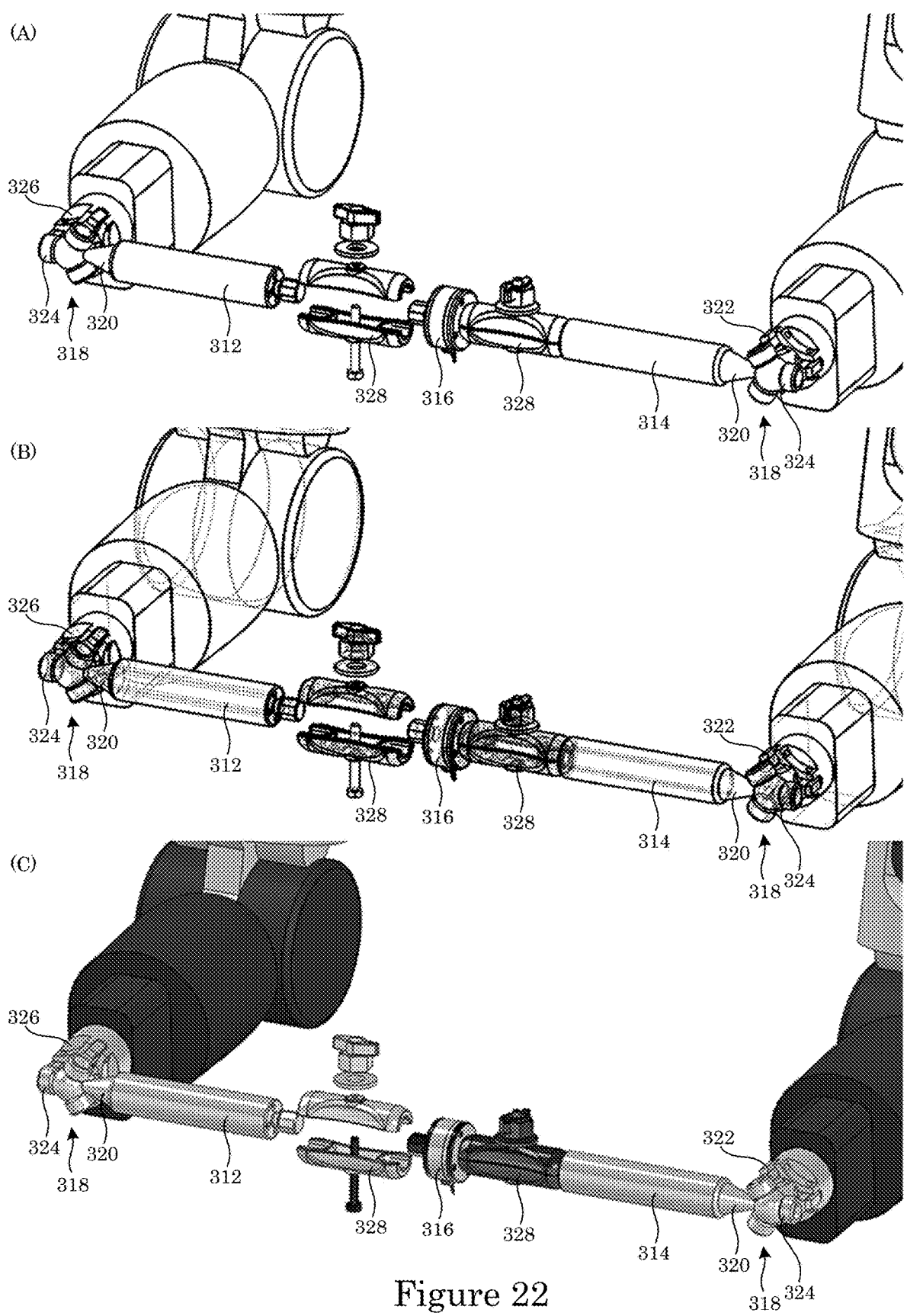
FIG. 22 shows a collaborative robot force/torque gauge that includes a length adjuster.
Figure 23:
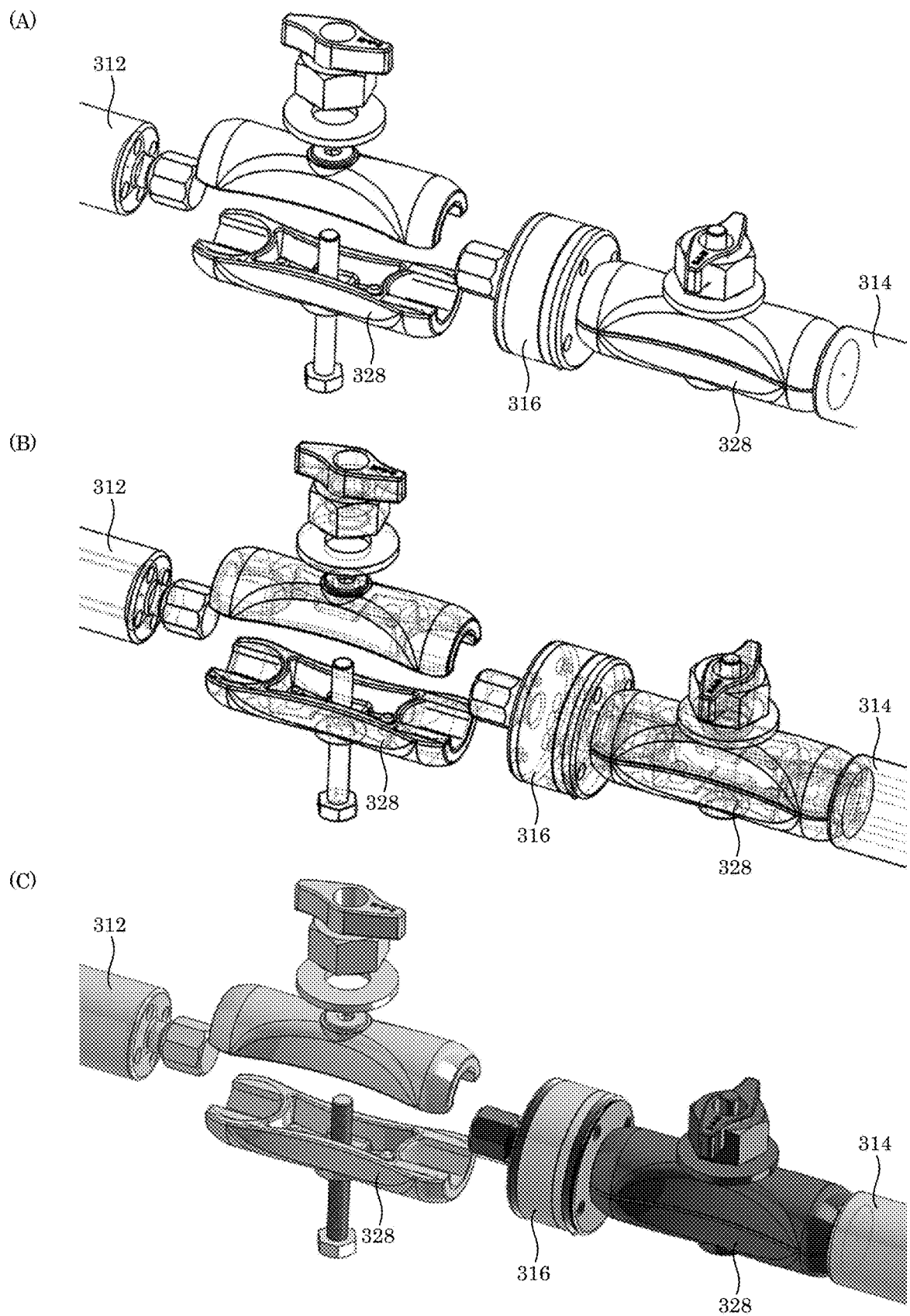
Figure 24:
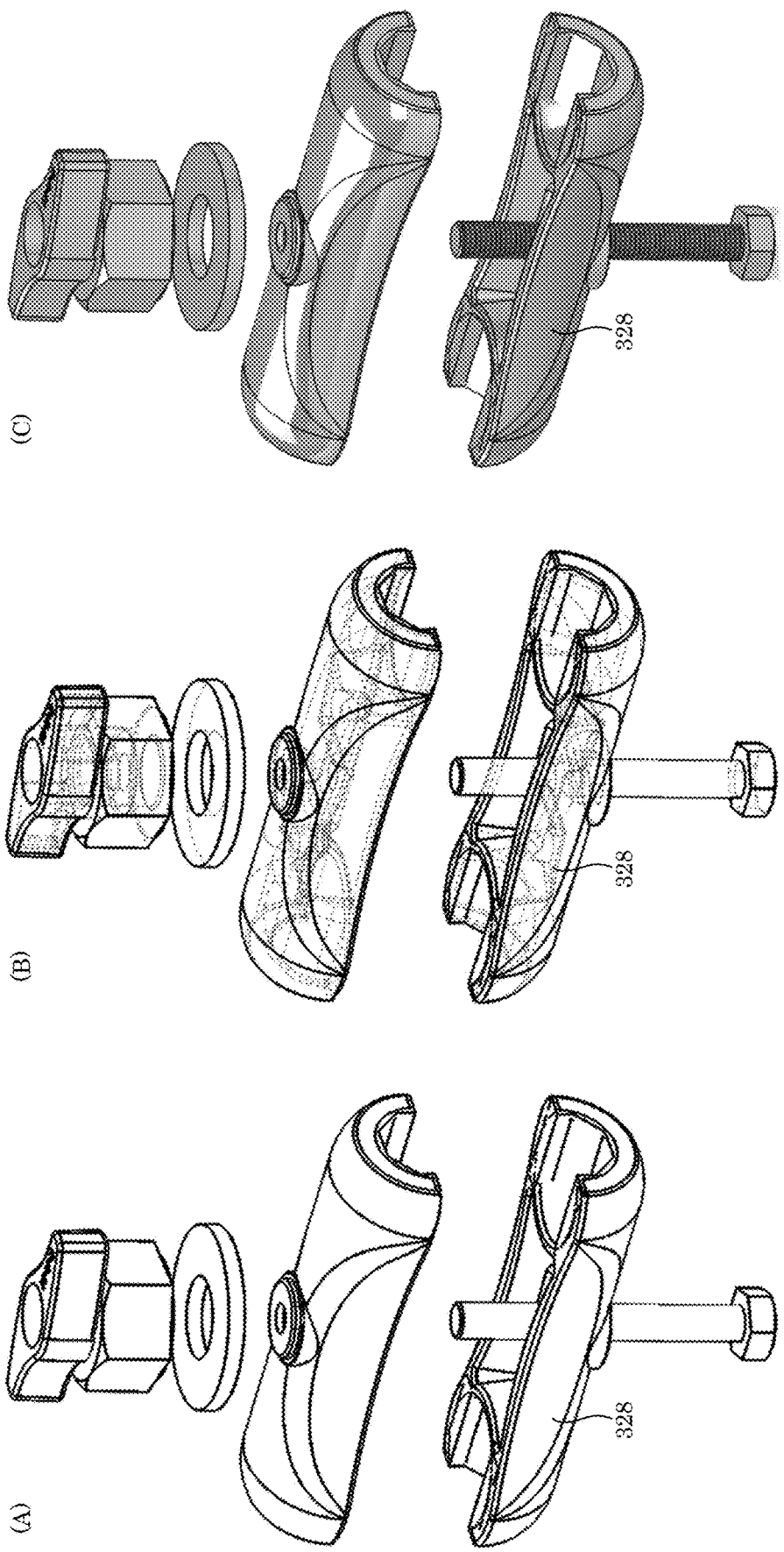
Figure 25:
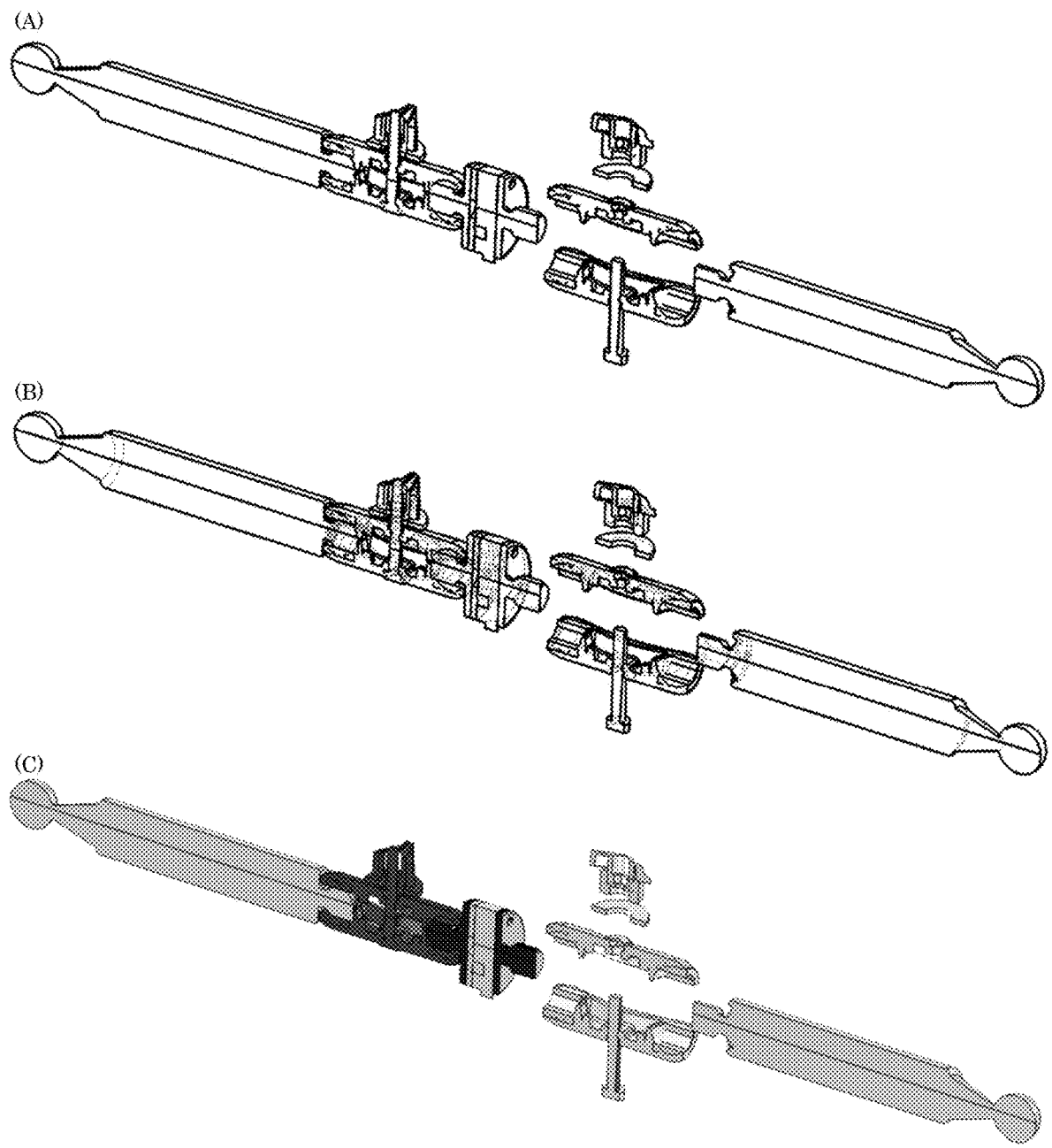
Figure 26:
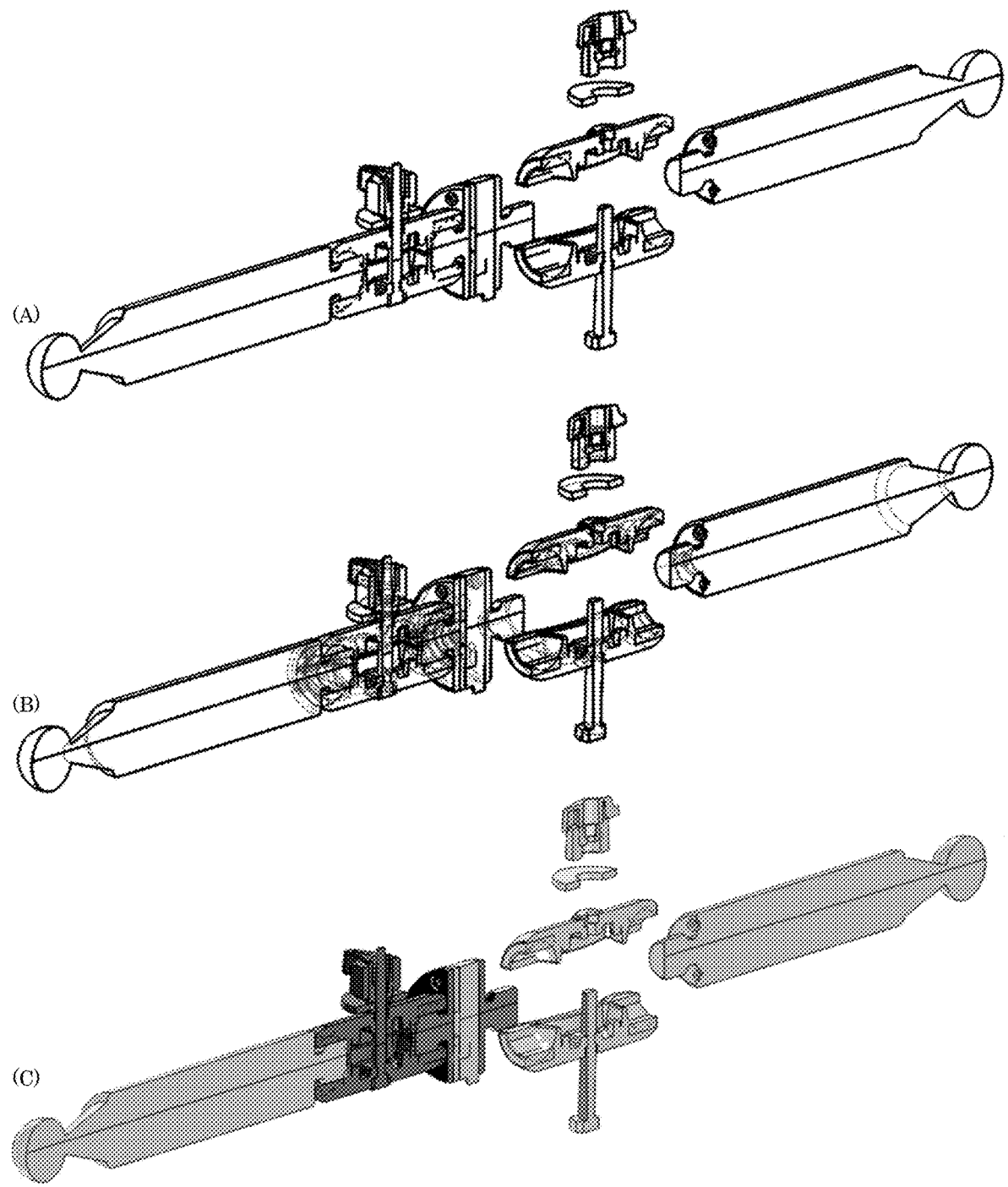

According to an embodiment, with reference to FIG. 19, FIG. 20, and FIG. 22, collaborative robot force-torque gauge 300 determines force and torque 310 exerted by collaborative robot 224. Collaborative robot force gauge 300 includes dextral bar 312; sinistral bar 314 disposed on dextral bar 312; force-torque cell 316 interposed between dextral bar 312 and sinistral bar 314; dextral arm coupler 326 disposed on dextral bar 312 via joint 318 such that dextral arm coupler 326: couples dextral arm 226 of collaborative robot 224 to dextral bar 312; and communicates force and torque 310 exerted by dextral arm 226 to force-torque cell 316 through dextral bar 312; and sinistral arm coupler 322 disposed on sinistral bar 314 via second joint 318 such that sinistral arm coupler 322: couples sinistral arm 238 of collaborative robot 224 to sinistral bar 314; and communicates force and torque 310 exerted by sinistral arm 238 to force-torque cell 316 through sinistral bar 314.

In collaborative robot force-torque gauge 300, joint 318 can include a ball-and-socket joint. Moreover, With reference to FIG. 22, collaborative robot force-torque gauge 300 can include length adjuster 328 interposed between joint 318 and second joint 318, e.g., interposed between dextral bar 312 and force-torque cell 316, interposed between sinistral bar 314 and force-torque cell 316, or a combination thereof.

It is contemplated that bar 210 can include beams, to provide structural support, and guide spacers, to keep multiple beams apart and aligned, and can be made of metal, plastic, fiber reinforced materials, etc. A length L of bar 210 can be selected based, on the workspace size capability of collaborative robots, which depends on the length of the robot arms and their attachment location. A thickness of bar 210 can be selected based on the allowable deformation of its middle point, under its own weight and the loads generated by the attached robot arms and can be less than 1% of the desired displacement measurement accuracy, set by the work application. A width W of bar 210 can be selected based, on the width of the motion metrology sensors. Moreover, the bar may consist of several beams, oriented parallel to each. A shape of bar 210 can be, round, rectangular, or a combination thereof.

In collaborative robot motion gauge 200, dextral metrology member 212 can include the gauge metrology sensor, a bar clamping mechanism, and the motion coupler of the ball and socket joint to the robot arm, to transfer the robot arm motion to the displacement sensor and can be made of metal, plastic, or fiber reinforced material. Moreover, it must be appropriately rigid to minimize metrology sensor measurement errors and damage. A length of dextral metrology member 212 can be selected based on the length of the metrology sensor. A width W of dextral metrology member 212 can be selected based, on the width of the metrology sensor and the width of the bar. Moreover, it must be rigid enough to keep the displacement measurement errors below a desired accuracy level.

In collaborative robot motion gauge 200, sinistral metrology member 214 can include the gauge metrology sensor, a bar clamping mechanism, and the motion coupler of the ball and socket joint to the robot arm, to transfer the robot arm motion to the displacement sensor and can be made of metal, plastic, or fiber reinforced material. A length of sinistral metrology member 214 can be selected based on the length of the metrology sensor. A width W of sinistral metrology member 214 can be selected based on the width of the metrology sensor and the width of the bar. Moreover, it is rigid enough to keep the displacement measurement errors below a desired accuracy level.

In collaborative robot motion gauge 200 dextral displacement sensor 220 can include one or more light weight high accuracy and resolution linear potentiometers, or linear variable differential transformers (LVDT), or optical sensors, or linear encoders, etc.

Figure 27:
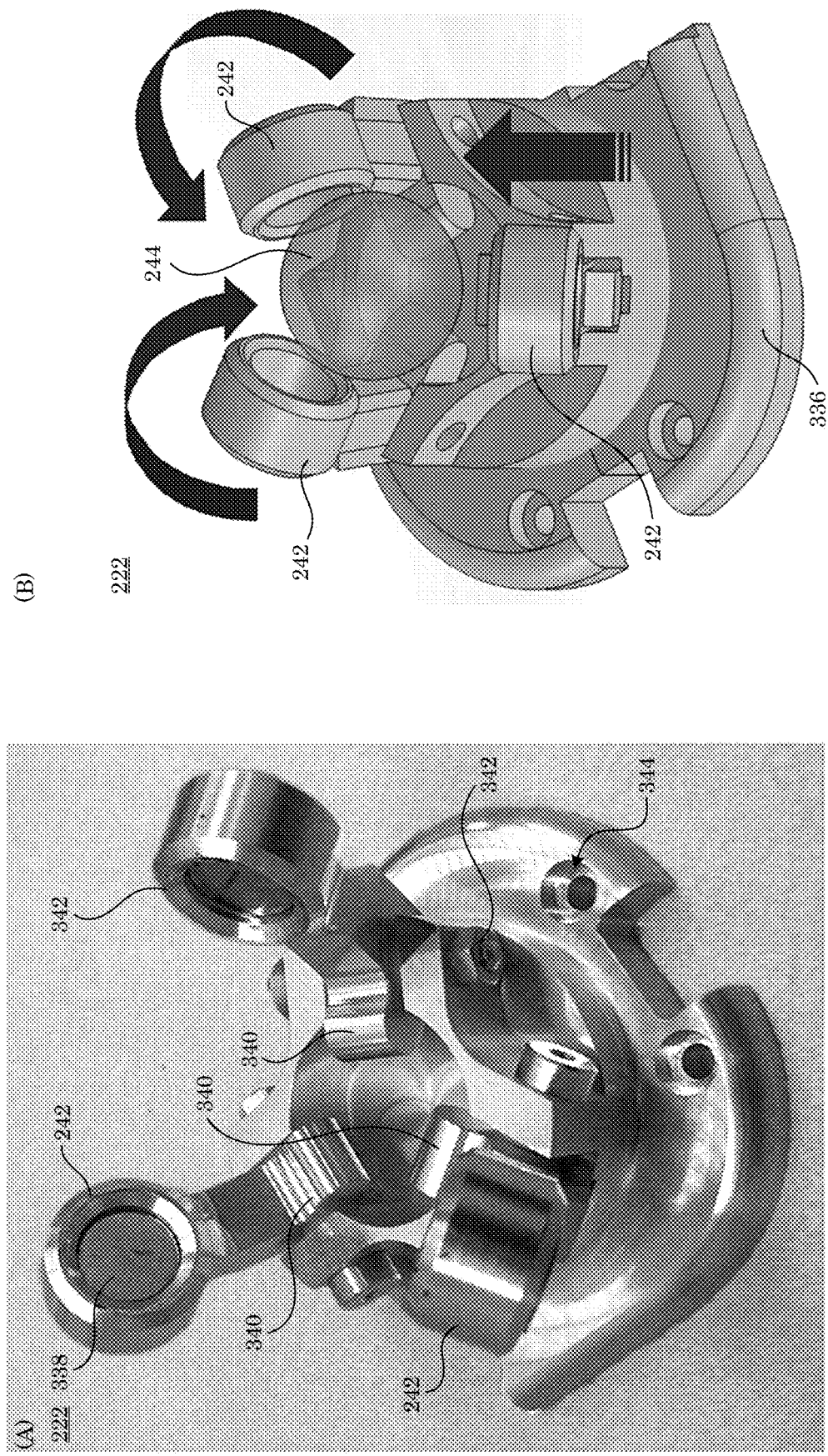
FIG. 27 shows an arm coupler in panel A and a ball received in the arm coupler in panel B.
Figure 28:
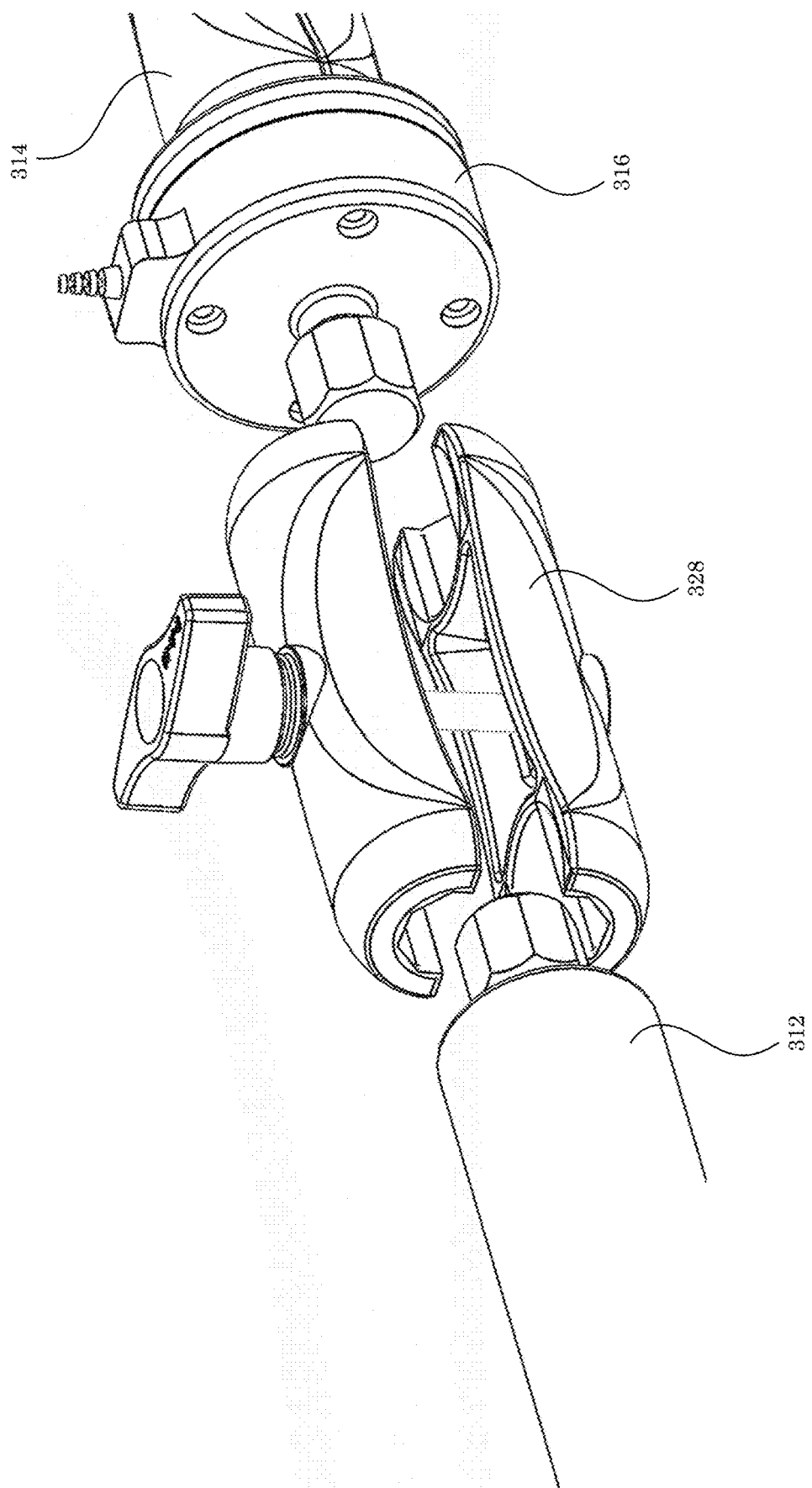
FIG. 28 shows an expanded view of the length adjuster shown in FIG. 22.

In an embodiment, with reference to FIG. 27, dextral arm coupler 222 can include socket 242 with magnet 338 to interact and grip ball 244, wherein ball 244 is received in a plurality of sockets 242 (e.g., 2, 3, or more) to securely fasten ball 244 in dextral arm coupler 222. Moreover, base lever 340 is pivotally disposed with socket 242 such that when socket 242 receives ball 244, base lever 340 can rotate to a stop position. Socket 242 and base lever 340 are pivotally attached to plate mount 336 by fastener 342 (e.g., a bolt). Plate mount 336 can include mount hole 344 to receive a fastener for attachment to an arm (e.g., dextral arm 226 or sinistral arm 238) of collaborative robot 224. It is contemplated that dextral arm coupler 222 can be made of metal, plastic, or fiber reinforced material. Its size may depend on the size and strength of the robot arm (e.g., the magnitude of forces and torques that it can apply to manipulated objects).

Collaborative robot 224 can be an industrial robot, or a mining robot, or a construction robot, or a service robot (e.g., firefighting, food service, hospitality, entertainment robot), or a medical robot, or an elderly care robot, or an agricultural robot, or an outer space robot, and any other suitable applications for collaborative robots.

Dextral arm 226 can be a multi degree of freedom robot arm, with rotary joints, or with prismatic joints, or with parallel mechanism joints, or a combination of the above. It can be powered by electrical power, or hydraulic power, or pneumatic power, or chemical power, or a combination of the above, or other form of suitable power.

Motion 228 can occur under manual control (e.g., joystick, or manual contact guidance), or prerecorded motions and via locations, or mathematically programmed with help from computer aided design.

Dextral motion coupler 230 can be free to slide on light weight precision low friction bearings mounted on bar 210 structural support beams. One side can be connected to a magnetic ball and socket gripper coupled to the dextral arm coupler. The other side can be connected to the dextral displacement sensor.

Sinistral motion coupler 232 can be free to slide on light weight precision low friction bearings mounted on the bar 210 structural support beams. One side can be connected to a magnetic ball and socket gripper coupled to the 236 sinistral arm coupler. The other side can be connected to the 234 sinistral displacement sensor.

In an embodiment, with reference to FIG. 27, sinistral arm coupler 236 can include socket 242 with magnet 338 to interact and grip ball 244, wherein ball 244 is received in a plurality of sockets 242 (e.g., 2, 3, or more) to securely fasten ball 244 in sinistral arm coupler 236. Moreover, base lever 340 is pivotally disposed with socket 242 such that when socket 242 receives ball 244, base lever 340 can rotate to a stop position. Socket 242 and base lever 340 are pivotally attached to plate mount 336 by fastener 342 (e.g., a bolt). Plate mount 336 can include mount hole 344 to receive a fastener for attachment to an arm (e.g., sinistral arm 238) of collaborative robot 224. It is contemplated that sinistral arm coupler 236 can be made of metal, plastic, or fiber reinforced material. Its size may depend on the size and strength of the robot arm (e.g., the magnitude of forces and torques that it can apply to manipulated objects).

Sinistral arm 238 can be a multi degree of freedom robot arm, with rotary joints, or with prismatic joints, or with parallel mechanism joints, or a combination of the above. It can be powered by electrical power, or hydraulic power, or pneumatic power, or chemical power, or a combination of the above, or other form of suitable power.

Figure 2:
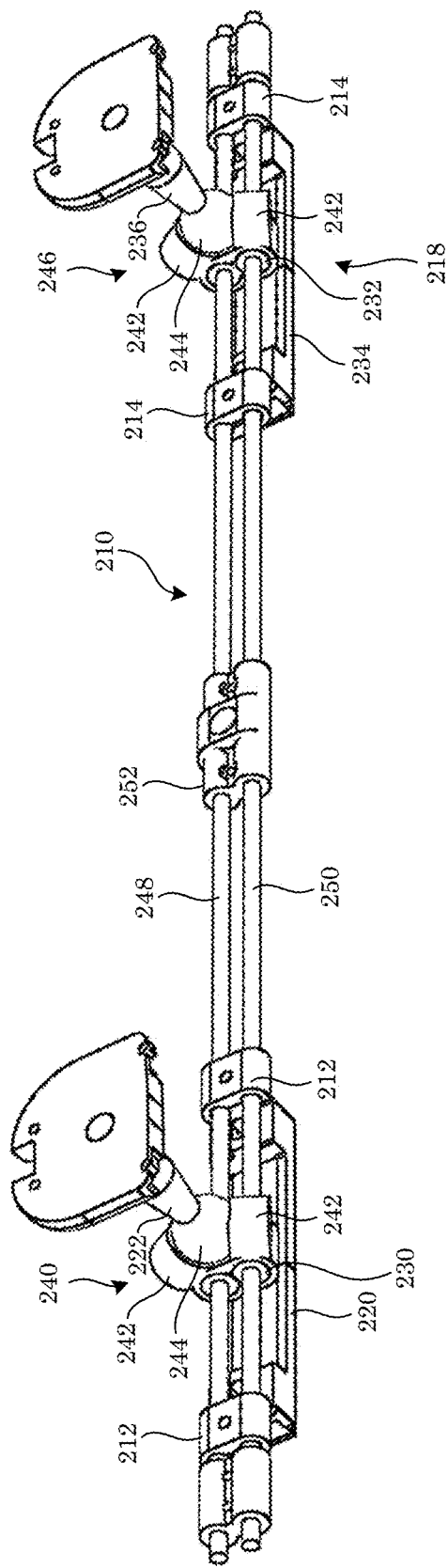
FIG. 2 shows a collaborative robot motion gauge.

In an embodiment, with reference to FIG. 2, dextral arm coupler 222 can include socket 242 with magnet to interact and grip ball 244, wherein ball 244 is received in a plurality of sockets 242 (e.g., 2, 3, or more) to securely fasten ball 244 in dextral arm coupler 222. Socket 242 is pivotally attached to dextral motion coupler 230.

With regard to socket 242, with magnet 338 to interact and grip ball 244, the magnet ends facing each other have the same polarity, so that they repel each other and the socket fingers remain open. In the presence of a magnetic ball the socket fingers close to grip the ball. It is contemplated that socket joint 242 can be made of metal, plastic, or fiber reinforced material. Its size may depend on the size and strength of the robot arm.

Ball 244 can be made of a magnetic metal (e.g., magnetic steel or magnetic stainless steel).

With regard to sinistral ball-and-socket joint 246, sinistral arm coupler 236 can include socket 242 with magnet to interact and grip ball 244, wherein ball 244 is received in a plurality of sockets 242 (e.g., 2, 3, or more) to securely fasten ball 244 in sinistral arm coupler 236. Socket 242 is pivotally attached to sinistral motion coupler 232.

With regard to primary guide 248 and with reference to FIG. 2, bar 210 can include a plurality of guide beams, to provide structural support, which can be made of metal, plastic, fiber reinforced materials, etc. These guide beams can have round, or rectangular cross section, or a combination thereof. FIG. 2 shows a design with two cylindrical guide beams, named primary and secondary.

With regard to secondary guide 250 and with reference to FIG. 2, bar 210 can include a plurality of guide beams, to provide structural support, which can be made of metal, plastic, fiber reinforced materials, etc. These guide beams can have round, or rectangular cross section, or a combination thereof. FIG. 2 shows a design with two cylindrical guide beams, named primary and secondary.

With regard to guide spacer 252 and with reference to FIG. 2, bar 210 can include a plurality of guide beams, to keep these multiple guide beams apart and aligned a multitude of guide spacers are used, and can be made of metal, plastic, fiber reinforced materials, etc. FIG. 2 shows a design with two cylindrical guide beams, and a single guide spacer 252.

With regard to hexapod 254, hexapod 254 can be a six degrees of freedom parallel mechanism with variable length struts as shown in FIG. 14. In this arrangement, hexapod 254 in combination with collaborative robot motion gauge 200 measures the position and orientation of its moving platform. Mounting collaborative robot motion gauge 200 hexapod 254 can provide position and orientation information to that measurement.

It is contemplated that the collaborative robot can have a pose. The pose can include a position and orientation of the end of arm plate of a robot arm.

Collaboration bar 258 is in mechanical communication with bar 210, metrology member 260, coupler 264 as shown in FIG. 16 and can be constructed similar to bar 210.

Collaboration metrology member 260 is disposed on collaboration bar 258 at distal position 262 relative to bar 210 in FIG. 16.

Collaboration motion coupler 264 is moveably disposed on collaboration bar 258 proximate to collaboration metrology member 260 in FIG. 16.

Collaboration displacement sensor 266 is disposed on collaboration metrology member 260 in communication with collaboration motion coupler 264 in FIG. 16.

Collaboration arm coupler 268 is disposed on collaboration motion coupler 264 and couples to collaboration arm 270 of second robot 272 in FIG. 18.

Collaboration arm 270 couples to collaboration arm coupler 268 and second robot 272 in FIG. 18.

Extension joint 274 joins bar 210 and collaboration bar 258 as shown in FIG. 16.

Extension coupler 276 is disposed on bar 210 and receives attachment in extension joint 274 as shown in FIG. 16.

Attachment coupler 278 is disposed on collaboration bar 258, wherein extension coupler 276 receives attachment coupler 278 in extension joint 274 as shown in FIG. 16.

Collaboration ball-and-socket joint 280 includes a portion of collaboration motion coupler 264 and the collaboration arm coupler 268 as shown in FIG. 16.

Figure 21:
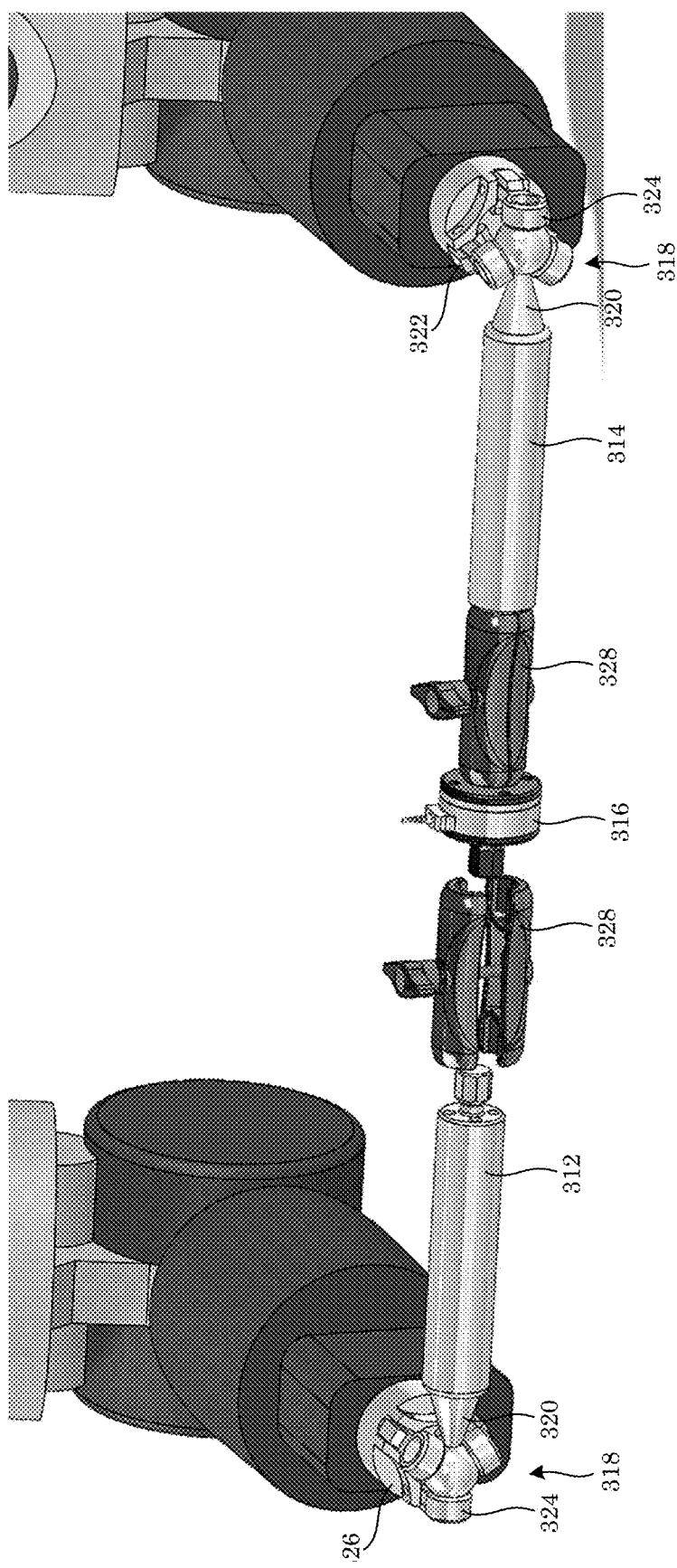

Force and torque is exerted by a collaborative robot and can be determined by dextral bar 312 and sinistral bar 314; force-torque cell 316 is interposed between the dextral bar and the sinistral bar as shown in FIGS. 20 and 21.

Dextral bar 312 communicates force and torque exerted by the dextral arm to the force-torque cell through the dextral arm as shown in FIG. 19.

Sinistral bar 314 communicates force and torque exerted by the sinistral arm to the force-torque cell through the sinistral arm as shown in FIG. 19.

Force-torque cell 316 is interposed between the dextral bar 312 and the sinistral bar 314 as shown in FIG. 19

Figure 4:
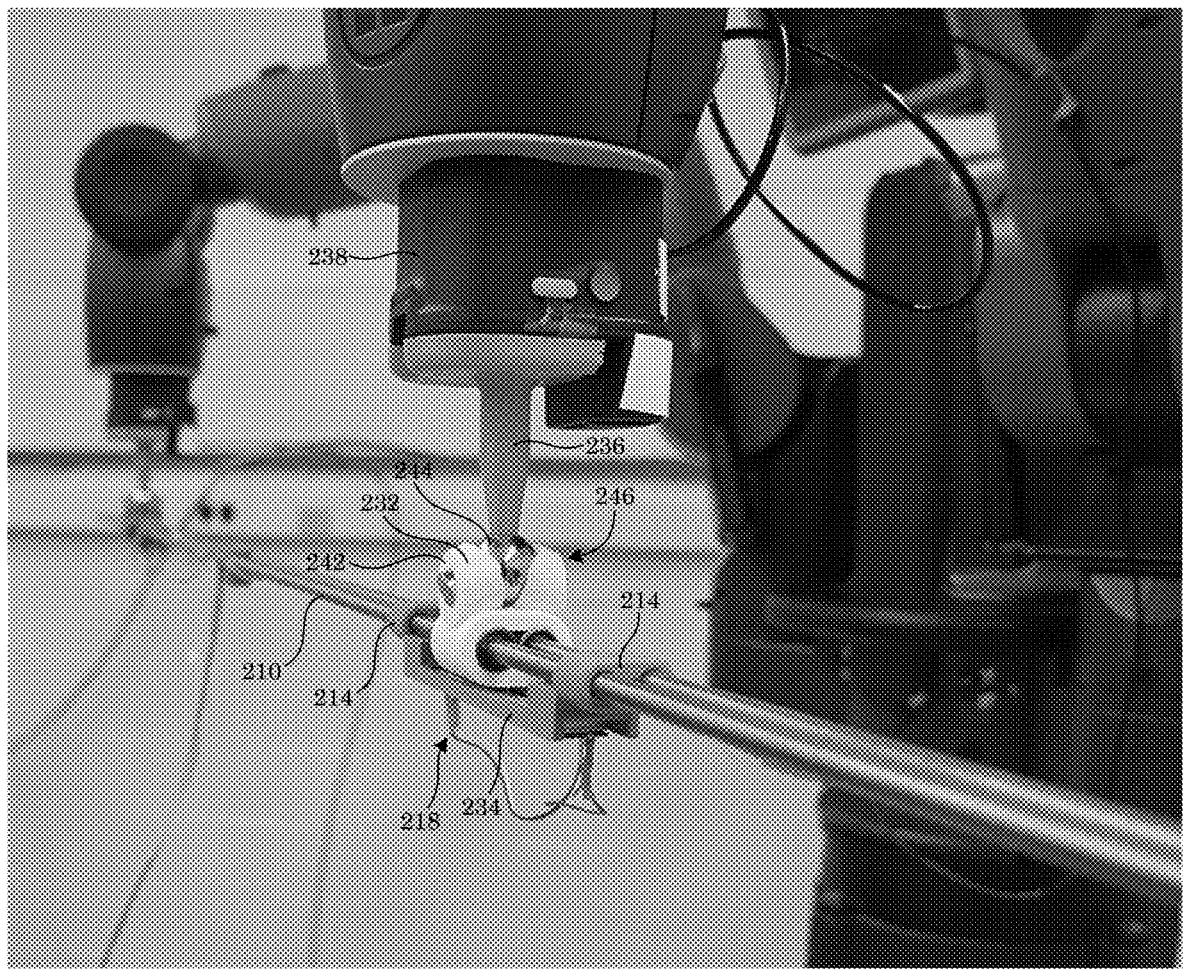
FIG. 4 shows an enlarged view of a sinistral portion of the collaborative robot motion gauge shown in FIG. 3.

With regard to joint 246, a motion coupler includes a socket, and another coupler includes a ball, wherein the socket receives the ball to form a ball-and-socket joint (e.g., joint 246 in FIG. 4).

Sinistral arm coupler 236 couples sinistral arm 238 of collaborative robot 224 to sinistral motion coupler 232 as shown in FIG. 4.

Figure 3:
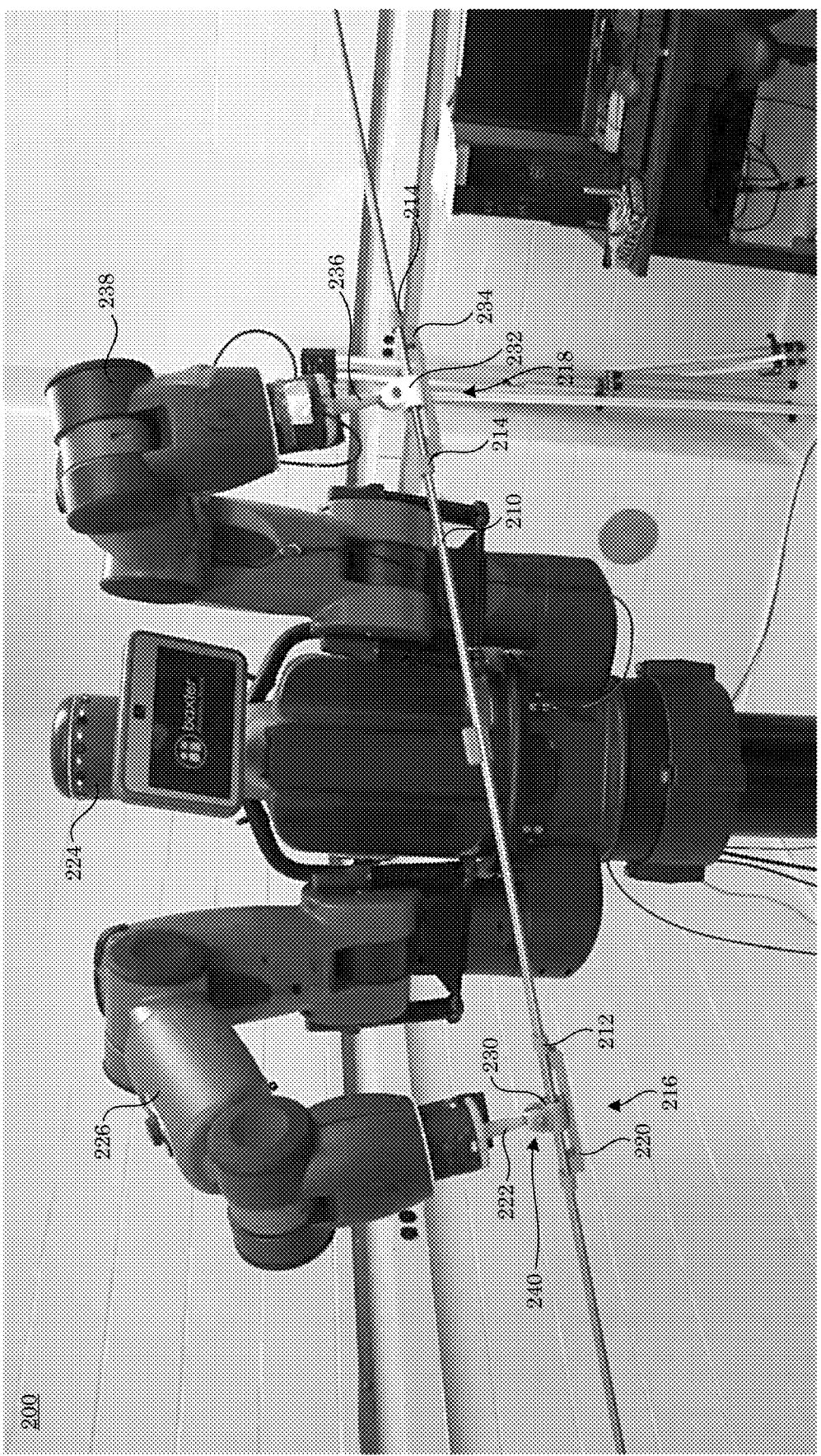
FIG. 3 shows a collaborative robot motion gauge disposed on a collaborative robot.

Dextral arm coupler 222 couples dextral arm 226 of collaborative robot 224 to dextral motion coupler 230 as shown in FIG. 3.

Length adjuster 328 is interposed between joint 318 and second joint 318, e.g., interposed between dextral bar 312 and force-torque cell 316, interposed between sinistral bar 314 and force-torque cell 316, or a combination thereof as shown in FIG. 22.

Dextral displacement signal is produced by dextral displacement sensor 220 in response to detecting movement of dextral motion coupler 230 as shown in FIG. 1.

Sinistral displacement signal is produced by sinistral displacement sensor 234 in response to detecting movement of sinistral motion coupler 232 as shown in FIG. 1

Plate mount 336 can include mount hole 344 to receive a fastener for attachment to an arm (e.g., dextral arm 226) of collaborative robot 224 as shown in FIG. 27.

Magnet 338 interacts and grips ball 244, wherein ball 244 is received in a plurality of sockets 242 (e.g., 2, 3, or more).

Base lever 340 is pivotally disposed with socket 242 such that when socket 242 receives ball 244, base lever 340 can rotate to a stop position as shown in FIG. 27.

Fastener 342 (e.g., a bolt) pivotally attaches base lever 340 to plate mount 336.

Mount hole 344 in plate mount 336 receives a fastener for attachment to an arm (e.g., dextral arm 226) of collaborative robot 224.

Collaborative robot motion gauge 200 can be made in various ways including machining, photolithography, 3-D printing, embossing, laser ablation, acid etching, and the like. In an embodiment, a process for making collaborative robot motion gauge 200 includes disposing bar 210, if it consists of a multitude of beams on guide spacer 252 at its middle position; mounting dextral motion coupler 230 on bar 210 and dispose the assembly on dextral metrology member 212; mounting sinistral motion coupler 232 on bar 210; and disposing the assembly on sinistral metrology member 214.

In an embodiment, guide spacer 252 include two parts and a fastener that clamps the two parts on the multitude of bar 210 beams, in a fixed position and orientation to each other, dextral motion coupler 230 includes sliding bearings that allow it to slide in bar 210, dextral metrology member 212 includes two mounts, each including two parts and a fastener that clamps the two parts on bar 210. Sinistral motion coupler 232 includes sliding bearings that allow it to slide in bar 210, sinistral metrology member 214 includes two mounts, each include two parts and a fastener that clamps the two parts on bar 210.

Collaborative robot force-torque gauge 300 can be made in various ways including machining, photolithography, 3-D printing, embossing, laser ablation, acid etching, and the like. In an embodiment, a process for making collaborative robot force-torque gauge 300 includes disposing joint 318 on dextral side of bar 312 and bar 312 on dextral side of force-torque cell 316; disposing joint 318 on sinistral side of bar 314 and then bar 314 on sinistral side of force-torque cell 316. To extend a length of bar 312, length adjuster 328 can be disposed between bar 312 and force-torque cell 316. To extend a length of bar 314, length adjuster 328 can be disposed between bar 314 and force-torque cell 316.

In an embodiment, joint 318 is attached to the dextral side of bar 312 with a threaded fastener that fits into threaded holes of both parts. Further, bar 312 is attached on dextral side of force-torque cell 316. Joint 318 is attached to the sinistral side of bar 314 with a threaded fastener that fits into threaded holes of both parts. Bar 314 is attached on sinistral side of force-torque cell 316. To extend a length of bar 312, length adjuster 328 can be disposed between bar 312 and force-torque cell 316, wherein a clam shell of length adjuster 328 closes tightly, with the adjuster fastener, on the heads of two screws mounted in threaded holes of bar 312 and force-torque cell 316. Similarly, to extend a length of bar 314, length adjuster 328 can be disposed between bar 314 and force-torque cell 316, where the clam shell of length adjuster 328 closes tightly on the heads of two screws mounted in threaded holes of bar 314 and force-torque cell 316. In the case of large magnitude torques generated by the robot arms 226, 238, then set screws may be used to prevent loosening of the screw fasteners of the collaborative robot force gauge 300 parts.

Collaborative robot motion gauge 200 has numerous beneficial uses, including determining an error in a motion of collaborative robot 224. In an embodiment, a process for determining the error in the motion of collaborative robot 224, with collaborative robot motion gauge 200, includes: attaching collaborative robot motion gauge 200 to collaborative robot 224; moving dextral motion coupler 230 or sinistral motion coupler 232 in response to moving dextral arm 226 or sinistral arm 238 of collaborative robot 224; detecting movement of: dextral motion coupler 230 by dextral displacement sensor 220 when dextral arm 226 moves, and sinistral motion coupler 232 by sinistral displacement sensor 234 when sinistral arm 238 moves; producing dextral displacement signal 330, e.g., potentiometer output voltage, in FIG. 29 by dextral displacement sensor 220 in response to detecting movement of dextral motion coupler 230; producing sinistral displacement signal in FIG. 29 by sinistral displacement sensor 234 in response to detecting movement of sinistral motion coupler 232; and determining the error in the motion of collaborative robot 224 from dextral displacement signal 330 and sinistral displacement signal 332.

The process for determining the error in the motion of collaborative robot 224 can include programming the collaborative robot to move its arms along two arcs of a circle of various desired diameters, at various orientations of three-dimensional space, or to move its arms along two parallel lines located at various desired distances from each other, at various orientations of three-dimensional space, or other similar application relevant trajectories.

The process for determining the error in the motion of collaborative robot 224 also can include measuring the distance between the two arms of the collaborative robot 224 during the execution of the program.

Also, the process for determining the error can include subtracting the measured distance of the robot arms from the programmed distance to determine the motion error for each step of the programmed motion, and then calculating the accuracy error and its standard deviation, also referred to as accuracy and repeatability (3× standard deviation) errors.

In the process for determining the error in the motion of collaborative robot 224, attaching collaborative robot motion gauge 200 to collaborative robot 224 includes attaching dextral motion coupler 230 to dextral arm coupler 222, and attaching sinistral motion coupler 232 to sinistral arm coupler 236.

In the process for determining the error in the motion of collaborative robot 224, moving dextral motion coupler 230 or sinistral motion coupler 232 in response to moving dextral arm 226 or sinistral arm 238 of collaborative robot 224, includes calibrating dextral displacement sensor 220 and sinistral displacement sensor 234 to a selected accuracy level for collaborative robot planned work.

In the process for determining the error in the motion of collaborative robot 224, moving dextral motion coupler 230 or sinistral motion coupler 232 in response to moving dextral arm 226 or sinistral arm 238 of collaborative robot 224 includes calibrating dextral displacement sensor 220 and sinistral displacement sensor 234 from an initial home position, that may be the sinistral end of travel position for the dextral displacement sensor 220, and the dextral end of travel position for the sinistral displacement sensor 234.

In the process for determining the error in the motion of collaborative robot 224, moving dextral motion coupler 230 or sinistral motion coupler 232 in response to moving dextral arm 226 or sinistral arm 238 of collaborative robot 224 includes measuring the distance between the home position of the dextral displacement sensor 220 and the home position of the sinistral displacement sensor 234.

Figure 29:
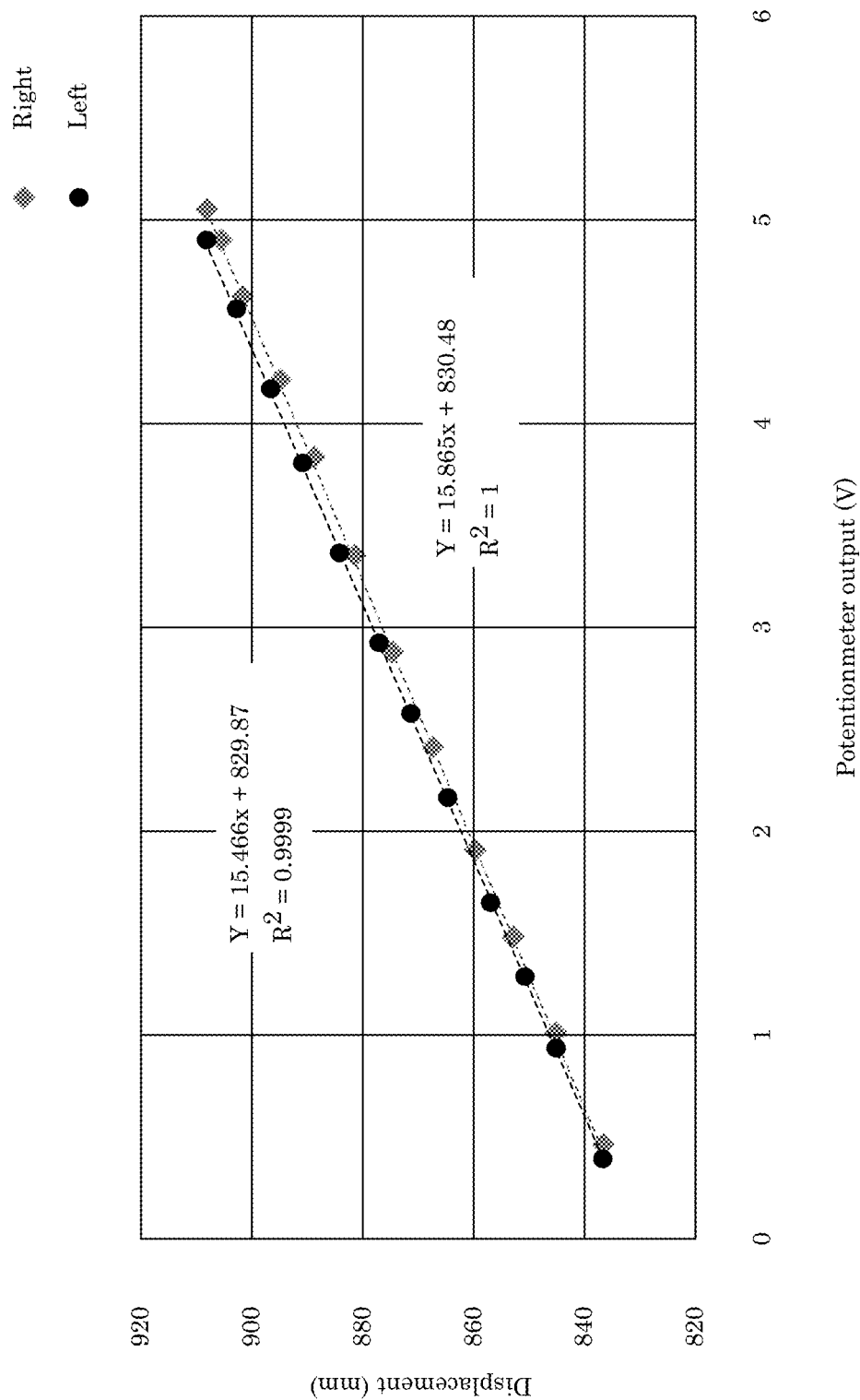
FIG. 29 shows a graph of displacement versus potentiometer output.

In the process for determining the error in the motion of collaborative robot 224, moving dextral motion coupler 230 or sinistral motion coupler 232 in response to moving dextral arm 226 or sinistral arm 238 of collaborative robot 224 includes measuring displacement of the dextral displacement sensor 220 from the home position of the sinistral displacement sensor 234 (see FIG. 29) and measuring the displacement of the sinistral displacement sensor 234 from the home position of the dextral displacement sensor 220 (see FIG. 29).

In the process for determining the error in the motion of collaborative robot 224, moving dextral motion coupler 230 or sinistral motion coupler 232 in response to moving dextral arm 226 or sinistral arm 238 of collaborative robot 224 includes calculating the distance between the dextral displacement sensor 220 from the sinistral displacement sensor 234 as the sum of the displacement of the dextral displacement sensor 220 and the displacement of the sinistral displacement sensor 234, and then subtracting the distance between the home position of the dextral displacement sensor 220 and the home position of the sinistral displacement sensor 234.

In the process for determining the error in the motion of collaborative robot 224, moving dextral motion coupler 230 or sinistral motion coupler 232 in response to moving dextral arm 226 or sinistral arm 238 of collaborative robot 224 includes measuring the three dimensional space coordinates of the positions of dextral displacement sensor 220 and the sinistral displacement sensor 234, with respect to a common reference frame, which can be accomplished with a variety of metrology instruments, including a commercial laser radar system like Nikon MV-2001, which can measure the 3D coordinates of the center of a tooling ball, with the measurement uncertainty of ±0.100 mm. This is accomplished by scanning its surface and finding the spot where a maximum intensity of the reflected laser light is measured. Placing balls 244 on dextral motion coupler 230 and sinistral motion coupler 232 provides measurement of the distance between the home position of the dextral displacement sensor 220 and the home position of the sinistral displacement sensor 234, with this instrument, also measurement of the displacement of the dextral displacement sensor 220 from the home position of the sinistral displacement sensor 234 (see FIG. 29), and measurement of the displacement of the sinistral displacement sensor 234 from the home position of the dextral displacement sensor 220 (see FIG. 29). The distance measurement between the home position of the dextral displacement sensor 220 and the home position of the sinistral displacement sensor 234 can be repeated for various size distances, which may be marked on the bar 210, for change of motion gauge 200 range, to make it suitable for various sizes of collaborative robots workspaces.

Collaborative robot force-torque gauge 300 has numerous beneficial uses, including determining a force and a torque exerted by collaborative robot 224. In an embodiment, a process for determining the force and torque exerted by collaborative robot 224, with collaborative robot force-torque gauge 300, includes: attaching collaborative robot force-torque gauge 300 to collaborative robot 224; applying the force and torque by dextral arm 226 and sinistral arm 238 of collaborative robot 224 to force-torque cell 316 through dextral bar 312 and sinistral bar 314; detecting the force and torque by force-torque cell 316; producing force and torque signal by force-torque cell 316 in response to detecting the force and torque; and determining the force and torque applied by collaborative robot 224 from force and torque signal 334.

The process for determining the force and torque exerted by collaborative robot 224 also can include determining an error in the application of a desired force and torque, by robot arm 226 to robot arm 238, during a prescribed motion of collaborative robot 224.

Also, the process for determining the force and torque error exerted by collaborative robot 224 can include programming the collaborative robot to move its arms along two arcs of a circle of various desired diameters, at various orientations of three-dimensional space, or to move its arms along two parallel lines located at various desired distances from each other, at various orientations of three-dimensional space, or other similar application relevant trajectories, while applying a certain desired force and torque to force-torque gauge 300.

In the process for determining the force and torque errors exerted by collaborative robot 224, attaching collaborative robot force-torque gauge 300 to collaborative robot 224 can include subtracting the measured force and torque of the robot arms from the programmed forces and torques, to determine the errors for each step of the programmed motion, and then calculating the accuracy errors and its standard deviations, commonly known as accuracy and repeatability (3× standard deviation) errors.

In the process for determining the force and torque exerted by collaborative robot 224, applying the force and torque by dextral arm 226 and sinistral arm 238 of collaborative robot 224 to force-torque cell 316 through dextral bar 312 and sinistral bar 314 includes calibrating collaborative robot force-torque gauge 300, which involves releasing dextral arm mount 336 or sinistral arm couple 336, and commanding the robot 224 to place the force-torque gauge 300 in a horizontal orientation.

In the process for determining the force and torque exerted by collaborative robot 224, applying the force and torque by dextral arm 226 and sinistral arm 238 of collaborative robot 224 to force-torque cell 316 through dextral bar 312 and sinistral bar 314 includes calibrating collaborative robot force-torque gauge 300, which includes suspending calibrated weights from the free arm mount 336. The measured forces by the force-torque gauge 300 should be equal to the suspended weights and the measured torques should be equal to the suspended weights multiplied by their horizontal distance from the force-torque cell 316, this process should be repeated for at least another location after the force-torque gauge 300 has been rotated 90° about its horizontal axis.

In the process for determining the force and torque exerted by collaborative robot 224, applying the force and torque by dextral arm 226 and sinistral arm 238 of collaborative robot 224 to force-torque cell 316 through dextral bar 312 and sinistral bar 314 includes calibrating collaborative robot force-torque gauge 300, which includes the mounting of a horizontal bar from the free arm mount 336, and suspending calibrated weights from the free end of the bar. The measured forces by the force-torque gauge 300 should be equal to the suspended weights and the measured torques should be equal to the suspended weights multiplied by their horizontal distance from the center line of the force-torque gauge 300, this process should be repeated for at least another location after the bar has been rotated 180 degrees about the center line of the force-torque gauge 300.

In the process for determining the force and torque exerted by collaborative robot 224, applying the force and torque by dextral arm 226 and sinistral arm 238 of collaborative robot 224 to force-torque cell 316 through dextral bar 312 and sinistral bar 314 includes calibrating collaborative robot force-torque gauge 300, which involves releasing dextral arm mount 336 or sinistral arm couple 336, and commanding the robot 224 to place the force-torque gauge 300 in a vertical orientation, which includes suspending calibrated weights from the free arm mount 336. The measured forces by the force-torque gauge 300 should be equal to the suspended weights.

Collaborative robot motion gauge 200 and collaborative robot force gauge 300 have numerous advantageous and beneficial properties. In an aspect, collaborative robot motion gauge 200 can measure the accuracy, repeatability, and reproducibility of a collaborative robot for any position and orientation of its arms within its workspace, and also generate data that can be used for the development of the collaborative robot kinematic mechanism mathematical model. Moreover, collaborative robot motion gauge 200 advantageously and unexpectedly identifies software and hardware problems with the operation of the robot arms for each location and orientation in its workspace, which may result in corrective action that minimizes these errors. In the absence of a hardware problem, modifications of the controller commands, at locations identified by test results, can eliminate operation errors. Joint position sensor errors are not uncommon and may be identified, when that specific joint is activated in a motion test. Joint transmission problems generated by cases, like defective couplings or gear meshing, usually generate stiction and backlash, which manifest themselves during motion direction changes, which are included in all the motion tests described previously. Reproducibility errors are usually generated by robot arm joint drives when they try to find their home position after the joint sensor power is turned off and later on, which generates random offset errors, and can easily be detected by the motion gauge 200 instrument. Additionally, the motion gauge 200 has novel properties which make it uniquely useful for multi arm robots collaborating with each other, like the modular metrology bar design, that can accommodate three or more robot arms seeing in FIG. 16, modular bar position metrology sensors that can accommodate any size robot arms seeing in FIG. 3, and the metrology bar mounting capability on simple six degree of freedom metrology tools that can measure collaborative robot motion gauge 200 three-dimensional space position and orientation. All of the above-mentioned information is critical for the proper execution of one of the most important operations of collaborative robots, which is the pickup of heavy objects and their delivery to the commanded location with the commanded orientation.

In an aspect, collaborative robot force-torque gauge 300 can measure the accuracy, repeatability, and reproducibility of a collaborative robot arms to apply the commanded force and torque to objects manipulated and transported by their grippers within its workspace, and also generate data that can be used for the development of the collaborative robot dynamic mathematical model. Moreover, collaborative robot force gauge 300 advantageously and unexpectedly is modular and can adjust its length to accommodate any size of robot arms. The collaborative robot force-torque gauge 300 is complementary to that of the collaborative robot motion gauge 200, because it prevents the unexpected release of transported heavy objects or the crashing of fragile objects.

It is contemplated that collaborative robot motion gauge 200 and collaborative robot force-torque gauge 300 can be used by plant floor personnel to measure accuracy, repeatability, or reproducibility errors of multiple arms, which transport and position objects in three-dimensional (3D) space, perform movement along prescribed trajectories, manipulation of objects in 3D space, through application of proper force and torque, for fast and successful assembly and other type operations. Collaborative robot motion gauge 200 and collaborative robot force-torque gauge 300 connect to data collection and storage and analysis units to display test analysis results that provide periodic testing of collaborative robot arms performance. Further, after modification of a control program of collaborative robot, data from collaborative robot motion gauge 200 or collaborative robot force-torque gauge 300 can be used to schedule maintenance and warranty high quality product manufacturing. Collaborative robot motion gauge 200 and collaborative robot force-torque gauge 300 can be light weight and transportable to a robot work site while being easy to operate.

With regard to collaborative robot motion gauge 200, a supporting frame can be modular and include easy to assemble bars. The bars connect and can include a T-shape supporting frame for serving three collaborating robot arms as shown in FIG. 18, wherein two arms on the left belong to one robot, and the third arm on the right belongs to a second robot. An example of a collaborative manufacturing operation can be the assembly of the parts of a gear box, held by the two red sleeves robot arms, while the third arm can insert gears, retaining rings, and other parts that go in to a gear box. This robot metrology instrument modular variable shape provides for testing of controller programs under collaborating robot arm configurations so adjustments can be made before start of an actual manufacturing operation, decreasing production time and cost.

With regard to distance measurement sensors, an operating location and distance of collaborating robot arms can vary and depend on an application. The collaborative robot motion gauge 200 and collaborative robot force-torque gauge 300 can be modular metrology sensors with magnetic ball and socket couplings to robot arms and provide multi arm robot operation motion metrology sensors that can be mounted at pre-marked distance positions of a light weight measurement bar and with a selected wireless data transmission. The motion metrology sensor ends are free to slide on light weight precision low friction bearings. Collaborative robot motion gauge 200 can be motion metrology sensors that include light weight high accuracy and resolution linear displacement sensors, like linear potentiometers, linear variable differential transformers (LVDT), optical sensors or linear encoders, and the like. A magnetic ball and socket joint can be included in the motion metrology sensor. A magnetic material ball can be mounted at the end of a robot arm and can couple with the bar magnetic ball socket as shown in FIG. 5.

Collaborative robot motion gauge 200 measures the distance of collaborating arms, along the center-line of the bar, which indicates the ability of two or more robotic arms to collaborate with each other in a plurality of applications. These applications can include precise transport and positioning of objects in three-dimensional (3D) space, movement along prescribed trajectories, and the like. While the robotic arms move along prescribed trajectories in 3D space, the accuracy, repeatability, or reproducibility errors of these motions are measured by collaborative robot motion gauge 200.

To minimize deformation of collaborative robot motion gauge 200, due to its own weight and robot arms generated forces and moments, multiple high strength beams can be coupled together, to form each metrology bar as shown in FIG. 2.

Modular metrology sensors with magnetic ball and socket coupling to the robot arms provide significant flexibility in the testing of collaborating robot arms.

With regard to measurement of position and orientation of robot arms, coordinated multi arm robot operation motion can be determined by collaborative robot motion gauge 200. Here, such a metrology sensor includes a light weight distance measurement bar and can be equipped with 3D space position tracking targets and mechanical interfaces, which provide tracking of the position and orientation of the motion metrology sensor bar in 3D space. In an embodiment, collaborative robot motion gauge 200 is mounted on hexapod 254 that can be a six degrees of freedom parallel mechanism with variable length struts as shown in FIG. 14. In this arrangement, hexapod 254 in combination with collaborative robot motion gauge 200 measures the position and orientation of its moving platform. Mounting collaborative robot motion gauge 200 on hexapod 254 can provide position and orientation information to that measurement.

With regard to collaborative robot force-torque gauge 300, collaborative robot force-torque gauge 300 is modular and can include easy to assemble bars. The bars can connect to serve collaborative arms operating distance, which can vary from one application to another. FIG. 22 shows an adjustable length collaborative robot force gauge 300 that includes two light weight handle bars, a selected wireless data transmission force and torque (FIT) metrology sensor, and adjustable length light weight stiff bars that can couple firmly from one side with the handle bars and can couple the other side with the force and torque metrology sensor. These bars can be sleeves or clamping shells with a threaded locking pin that firmly attach to anchoring pins on the sensor and the handle bars.

With regard to magnetic attachment joints of collaborative robot force-torque gauge 300, collaborative robot force-torque gauge 300 provides coordinated multi arm robot operation force and torque (FIT) metrology with light weight handle bars attached to robot arms. The collaborative robot force-torque gauge 300 can include magnetic ball socket grippers with flexure finger clamp claws and base closing lever as shown in FIG. 27 and which are mounted at an end of a robot arm. A magnetic material ball is mounted at the end of each bar and couple with magnetic ball socket and flexure clamps. Here, the dextral arm coupler can be an aluminum sensor bar gripper equipped with three fingers, that latch on sensor bars balls when they move in the space between the fingers.

The finger claws carry embedded strong magnets at their tips, which keep the fingers separated in their home positions in the absence of any magnetic object in their work space. The magnet sides facing each other have the same polarity. When the magnetic stainless steel ball moves in their workspace they promptly close due to their magnetic attraction to the ball, and pressure at a small lever at the base of the claws. The strength of the gripping magnets and the friction coefficient of the contact surfaces depend on the expected maximum transmitted robot arm torque. The surfaces friction coefficient can be increased with a coating or mechanical roughness of the surfaces.

Collaborative robot force-torque gauge 300 can measure accuracy, repeatability, and reproducibility errors of multiple arms manipulation of objects in three-dimensional (3D) space, through the application of proper force and torque, for fast and successful assembly operations, and the like.

Figure 15:
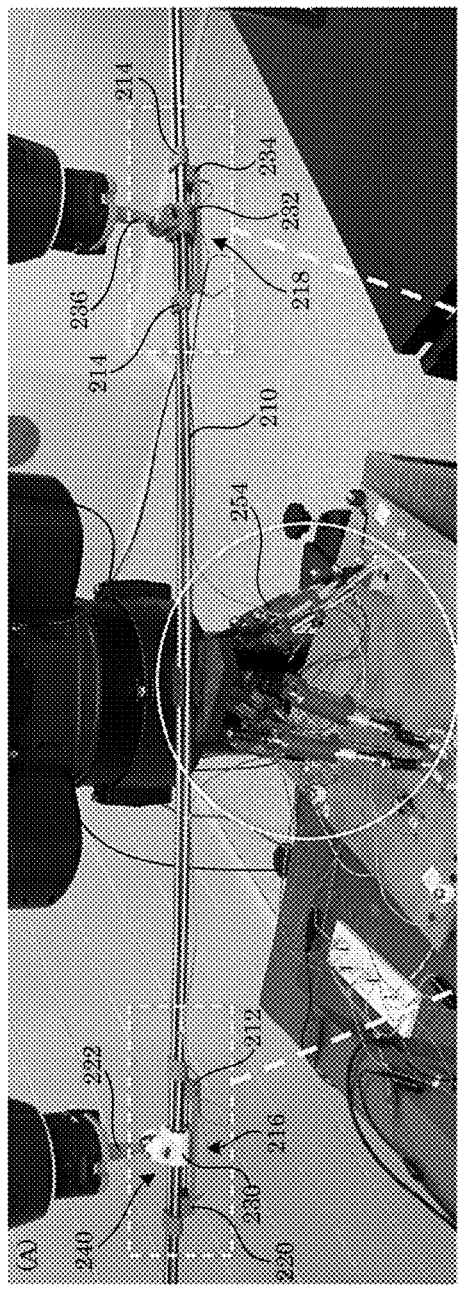
FIG. 15 shows an enlarged view of the collaborative robot motion gauge that includes a hexapod from FIG. 14.
Figure 15:
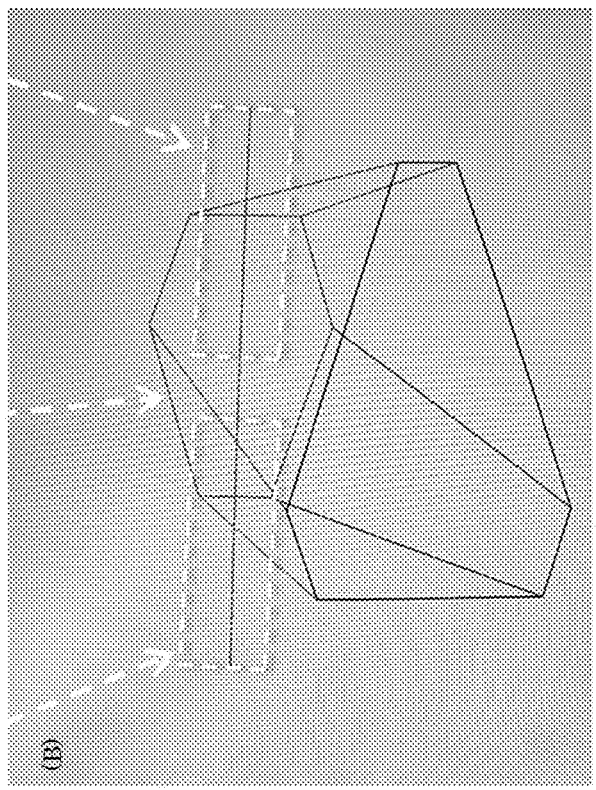

With regard to data collection, storage, and analysis units, collaborative robot motion gauge 200 and collaborative robot force-torque gauge 300 can be connected to data collection, storage, and analysis units that can display test analysis results in a variety of media and formats as shown in FIG. 15.

The articles and processes herein are illustrated further by the following Example, which is non-limiting.

Example

Calibration of collaborative robot with collaborative robot motion gauge.

The measurement of the three-dimensional space coordinates of the positions of dextral displacement sensor 220 and the sinistral displacement sensor 234, with respect to a common reference frame, can be accomplished with a variety of metrology instruments, including a commercial laser radar system like Nikon MV-2001, which can measure the 3D coordinates of the center of a tooling ball, with the measurement uncertainty of ±0.100 mm. This is accomplished by scanning its surface and finding the spot where a maximum intensity of the reflected laser light is measured. Placing balls 244 on dextral motion coupler 230 and sinistral motion coupler 232, it is possible to measure the distance between the home position of the dextral displacement sensor 220 and the home position of the sinistral displacement sensor 234, with this instrument, and also measure the displacement of the dextral displacement sensor 220 from the home position of the sinistral displacement sensor 234 (see FIG. 29), and measure the displacement of the sinistral displacement sensor 234 from the home position of the dextral displacement sensor 220 (see FIG. 29). The distance measurement between the home position of the dextral displacement sensor 220 and the home position of the sinistral displacement sensor 234, may be repeated for various size distances, which may be marked on the bar 210, for the convenient change of the motion gauge 200 range, to make it suitable for various sizes of collaborative robots workspaces.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about"

used in connection with a quantity is inclusive of the stated value and has the meaning dictated by the context (e.g., it includes the degree of error associated with measurement of the particular quantity).

What is claimed is:

1. A collaborative robot motion gauge that determines a motion of a collaborative robot and comprising:
a bar;
a dextral metrology member disposed on the bar at a dextral position;
a dextral motion coupler moveably disposed on the bar proximate to the dextral metrology member;
a dextral displacement sensor disposed on the dextral metrology member in communication with the dextral motion coupler;
a dextral arm coupler disposed on the dextral motion coupler and that:
couples to a dextral arm of the collaborative robot to the dextral motion coupler;
communicates motion of the dextral arm to the dextral displacement sensor; and
moves the dextral motion coupler in response to motion of the dextral arm;
a sinistral metrology member disposed on the bar at a sinistral position and spaced apart from the dextral metrology member on the bar;
a sinistral motion coupler moveably disposed on the bar proximate to the sinistral metrology member;
a sinistral displacement sensor disposed on the sinistral metrology member in communication with the sinistral motion coupler;
a sinistral arm coupler disposed on the sinistral motion coupler and that:
couples a sinistral arm of the collaborative robot to the sinistral motion coupler;
communicates motion of the sinistral arm to the sinistral displacement sensor; and
moves the sinistral motion coupler in response to motion of the sinistral arm.

2. The collaborative robot motion gauge of claim 1, further comprising a dextral ball-and-socket joint comprising a portion of the dextral motion coupler and the dextral arm coupler.

3. The collaborative robot motion gauge of claim 2, wherein the dextral motion coupler comprises a socket, and the dextral arm coupler comprises a ball,
wherein the socket receives the ball in the dextral ball-and-socket joint.

4. The collaborative robot motion gauge of claim 2, wherein the dextral motion coupler comprises a ball, and the dextral arm coupler comprises a socket,
wherein the socket receives the ball in the dextral ball-and-socket joint.

5. The collaborative robot motion gauge of claim 1, further comprising a sinistral ball-and-socket joint comprising a portion of the sinistral motion coupler and the sinistral arm coupler.

6. The collaborative robot motion gauge of claim 5, wherein the sinistral motion coupler comprises a socket, and the sinistral arm coupler comprises a ball,
wherein the socket receives the ball in the sinistral ball-and-socket joint.

7. The collaborative robot motion gauge of claim 5, wherein the sinistral motion coupler comprises a ball, and the sinistral arm coupler comprises a socket,
wherein the socket receives the ball in the sinistral ball-and-socket joint.

8. The collaborative robot motion gauge of claim 1, wherein the bar comprises:
a primary guide; and
a secondary guide spaced apart from the primary guide.

9. The collaborative robot motion gauge of claim 8, further comprising a guide spacer that separates the primary guide from the secondary guide.

10. The collaborative robot motion gauge of claim 1, further comprising a hexapod in mechanical communication with the bar, the hexapod determining a pose of the collaborative robot.

11. The collaborative robot motion gauge of claim 1, further comprising:
a collaboration bar in mechanical communication with the bar.

12. The collaborative robot motion gauge of claim 11, further comprising:
a collaboration metrology member disposed on the collaboration bar at a distal position relative to the bar.

13. The collaborative robot motion gauge of claim 12, further comprising:
a collaboration motion coupler moveably disposed on the collaboration bar proximate to the collaboration metrology member;
a collaboration displacement sensor disposed on the collaboration metrology member in communication with the collaboration motion coupler;
a collaboration arm coupler disposed on the collaboration motion coupler and that:
couples a collaboration arm of a second robot to the collaboration motion coupler;
communicates motion of the collaboration arm to the collaboration displacement sensor; and
moves the collaboration motion coupler in response to motion of the collaboration arm.

14. The collaborative robot motion gauge of claim 13, further comprising a collaboration ball-and-socket joint comprising a portion of the collaboration motion coupler and the collaboration arm coupler.

15. The collaborative robot motion gauge of claim 14, wherein the collaboration bar comprises:
a primary guide; and
a secondary guide spaced apart from the primary guide.

16. The collaborative robot motion gauge of claim 15, further comprising a guide spacer that separates the primary guide from the secondary guide.

17. The collaborative robot motion gauge of claim 11, further comprising an extension joint that joins the bar and the collaboration bar.

18. The collaborative robot motion gauge of claim 17, further comprising:
an extension coupler disposed on the bar;
an attachment coupler disposed on the collaboration bar,
wherein the extension coupler receives the attachment coupler in the extension joint.

19. A process for determining an error in a motion of a collaborative robot, with the collaborative robot motion gauge of claim 1, the process comprising:
attaching the collaborative robot motion gauge to the collaborative robot;
moving the dextral motion coupler or the sinistral motion coupler in response to moving the dextral arm or the sinistral arm of the collaborative robot;
detecting movement of:
the dextral motion coupler by the dextral displacement sensor when the dextral arm moves; or the sinistral motion coupler by the sinistral displacement sensor when the sinistral arm moves;
producing a dextral displacement signal by the dextral displacement sensor in response to detecting movement of dextral motion coupler;
producing a sinistral displacement signal by the sinistral displacement sensor in response to detecting movement of sinistral motion coupler; and
determining an error in the motion of the collaborative robot from the dextral displacement signal and the sinistral displacement signal.

* * * * *